United States Patent
Ohtomo et al.

(10) Patent No.: US 10,281,580 B2
(45) Date of Patent: May 7, 2019

(54) SURVEYING SYSTEM

(71) Applicant: TOPCON Corporation, Tokyo-to (JP)

(72) Inventors: Fumio Ohtomo, Saitama (JP); Kaoru Kumagai, Tokyo-to (JP); Hitoshi Otani, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 364 days.

(21) Appl. No.: 15/342,387

(22) Filed: Nov. 3, 2016

(65) Prior Publication Data
US 2017/0131404 A1    May 11, 2017

(30) Foreign Application Priority Data
Nov. 10, 2015  (JP) ................. 2015-220474

(51) Int. Cl.
*G01C 3/08* (2006.01)
*G01S 17/48* (2006.01)
(Continued)

(52) U.S. Cl.
CPC ............ *G01S 17/48* (2013.01); *G01C 15/002* (2013.01); *G01S 7/4812* (2013.01); *G01S 7/4814* (2013.01); *G01S 17/89* (2013.01); *G01S 7/4817* (2013.01)

(58) Field of Classification Search
CPC ...... G01S 17/10; G01S 7/4865; G01S 17/936; G01S 7/4915; G01S 17/32
See application file for complete search history.

(56) References Cited

U.S. PATENT DOCUMENTS 4,060,809 A * 11/1977 Baghdady ................. G01S 1/40
                                                   342/451
7,313,402 B1 * 12/2007 Rahman ................ H04W 24/06
                                                   455/456.1
(Continued)

FOREIGN PATENT DOCUMENTS

JP       2006-170688 A      6/2006
JP       2007-248156 A      9/2007
JP       2009-210388 A      9/2009

*Primary Examiner* — Samantha K Abraham
(74) *Attorney, Agent, or Firm* — Nields, Lemack & Frame, LLC

(57) ABSTRACT

The invention provides a surveying system, which comprises a surveying instrument, wherein the surveying instrument comprises a measuring unit for performing a distance measurement by projecting a distance measuring light toward an object to be measured and by receiving a reflected distance measuring light from the object to be measured, an image pickup unit having an image pickup optical axis running in parallel to a projection optical axis of the distance measuring light and for picking up an image including the object to be measured, an attitude detecting unit provided integrally with the measuring unit and for detecting a tilt angle with respect to the horizontal of the measuring unit, a coordinates acquiring unit for detecting a position of the surveying instrument and an arithmetic processing unit, wherein a first image of the object to be measured is acquired by the image pickup unit from a first position where coordinates of the first position are acquired by the coordinates acquiring unit, a second image of the object to be measured is acquired by the image pickup unit from a second position where coordinates of the second position are acquired by the coordinates acquiring unit, wherein the measuring unit directs a distance measuring optical axis toward common measuring points as specified in the first image and the second image respectively, projects the dis- (Continued)

tance measuring light, and carries out a first distance measurement from the first position and a second distance measurement from the second position, and wherein the arithmetic processing unit calculates horizontal distances from the first position and the second position respectively based on the tilt angles detected by the attitude detecting unit at the first position and the second position, on the first distance measurement and on the second distance measurement, and further the arithmetic processing unit is configured to calculate a base line length based on coordinates of the first position and on coordinates of the second position and to carry out a trilateration with respect to the measuring point based on the horizontal distance and on the base line length.

20 Claims, 13 Drawing Sheets

(51) Int. Cl.
*G01S 7/481* (2006.01)
*G01S 17/89* (2006.01)
*G01C 15/00* (2006.01)

(56) References Cited

U.S. PATENT DOCUMENTS

| | | | |
|---|---|---|---|
| 9,510,505 B2 * | 12/2016 | Halloran | A01D 34/008 |
| 2003/0174305 A1 * | 9/2003 | Kasper | G01C 15/002 |
| | | | 356/3.09 |
| 2005/0102063 A1 * | 5/2005 | Bierre | G01C 15/002 |
| | | | 700/247 |
| 2006/0126923 A1 | 6/2006 | Otani et al. | |
| 2007/0008515 A1 | 1/2007 | Otani et al. | |
| 2009/0225161 A1 | 9/2009 | Otani et al. | |
| 2009/0313370 A1 * | 12/2009 | Rhoads | G01S 5/26 |
| | | | 709/224 |
| 2013/0096873 A1 * | 4/2013 | Rosengaus | G01C 15/002 |
| | | | 702/151 |
| 2013/0116967 A1 * | 5/2013 | Akcasu | G04G 9/00 |
| | | | 702/150 |
| 2014/0018059 A1 * | 1/2014 | Noonan | H04W 48/04 |
| | | | 455/419 |
| 2014/0293266 A1 * | 10/2014 | Hsu | G01S 17/36 |
| | | | 356/5.01 |
| 2015/0140954 A1 * | 5/2015 | Maier | H04W 4/025 |
| | | | 455/404.2 |
| 2015/0334545 A1 * | 11/2015 | Maier | H04W 4/70 |
| | | | 455/404.2 |

* cited by examiner

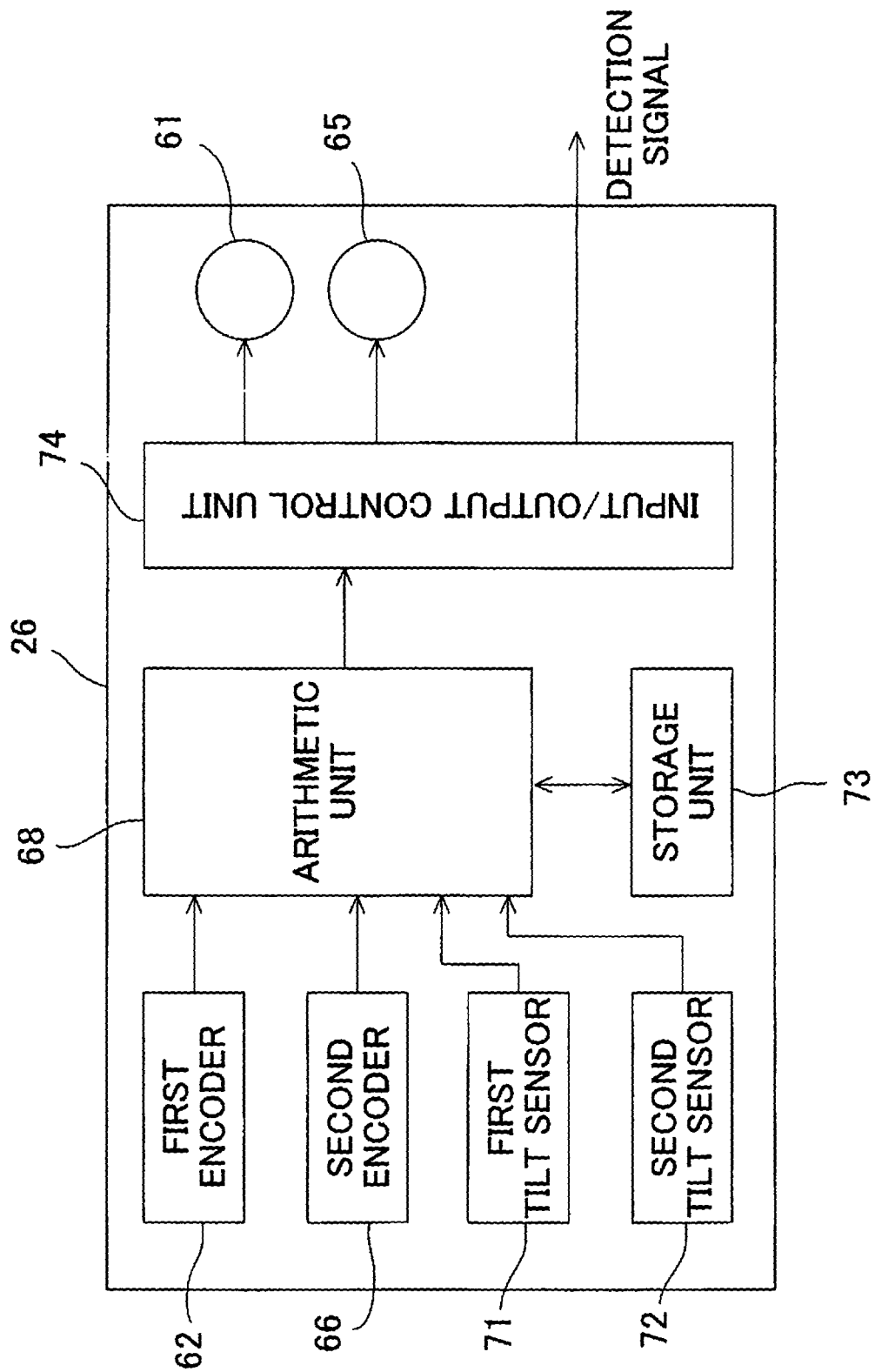

FIG. 8
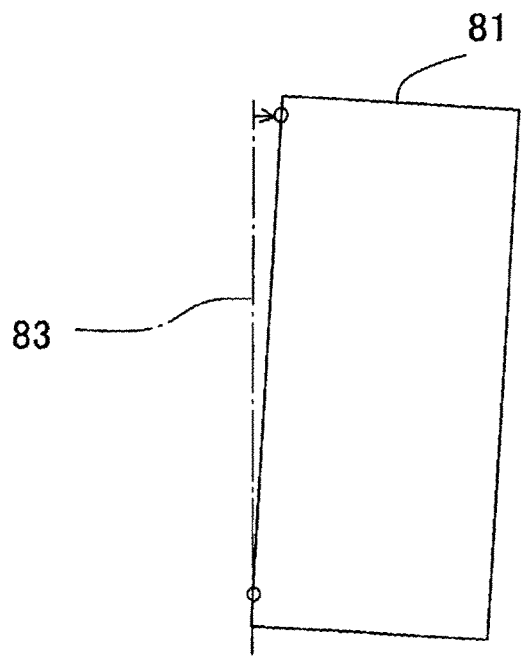
FIG. 9A  FIG. 9B  FIG. 9C
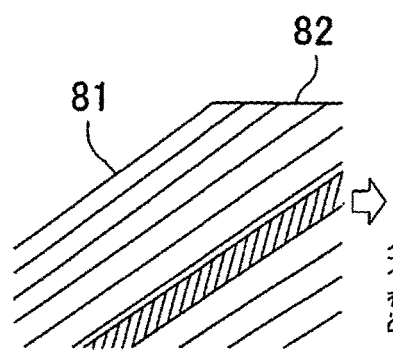
PICKED UP IMAGE
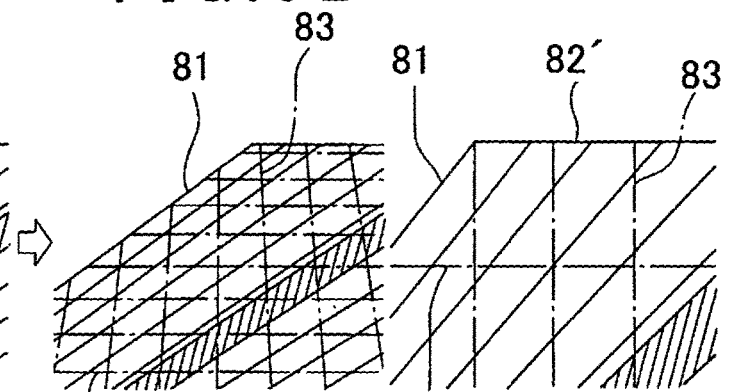
VERTICAL LINES ARE DISPLAYED
TURNED TO VERTICAL IMAGE $$F(\kappa_1, \phi_1, \kappa_2, \phi_2, \omega_2) = \begin{vmatrix} Y_1 & Z_1 \\ Y_2 & Z_2 \end{vmatrix} = Y_1 Z_2 - Y_2 Z_1 = 0 \cdots (1)$$

$\kappa_1$: ROTATION ANGLE OF Z-AXIS OF LEFT SIDE CAMERA
$\phi_1$: ROTATION ANGLE OF Y-AXIS OF LEFT SIDE CAMERA
$\kappa_2$: ROTATION ANGLE OF Z-AXIS OF RIGHT SIDE CAMERA
$\phi_2$: ROTATION ANGLE OF Y-AXIS OF RIGHT SIDE CAMERA
$\omega_2$: ROTATION ANGLE OF X-AXIS OF RIGHT SIDE CAMERA

SURVEYING SYSTEM

BACKGROUND OF THE INVENTION

The present invention relates to a surveying system for performing a trilateration in a simple and easy manner.

In general, a surveying expresses a plurality of measuring points, which are objects on a ground surface, in relation to a horizontal distance and a height. As a surveying instrument to be used for the surveying, a total station is known, for instance.

On a plurality of the measuring points, a distance (a slope distance), a vertical angle, and a horizontal angle are measured by the total station respectively, and the relations between the measuring points are obtained respectively.

Since in the total station, it is necessary to measure an angle with high accuracy, the total station must be installed via a tripod at an installation point (a reference point), and further must be leveled horizontally with high accuracy. For this reason, a time for installing is required, and further, a high skill is required.

Further, since in the total station, it is necessary to sight a plurality of the measuring points each time, much time is required for sighting, and a burden on the operator is heavy.

SUMMARY OF THE INVENTION

It is an object of the present invention to provide a surveying system, by which it is possible to omit an angle measurement, which a burden of an operation is heavy, and to perform a trilateration easily.

To attain the object as described above, a surveying system according to the present invention comprises a surveying instrument, wherein the surveying instrument comprises a measuring unit for performing a distance measurement by projecting a distance measuring light toward an object to be measured and by receiving a reflected distance measuring light from the object to be measured, an image pickup unit having an image pickup optical axis running in parallel to a projection optical axis of the distance measuring light and for picking up an image including the object to be measured, an attitude detecting unit provided integrally with the measuring unit and for detecting a tilt angle with respect to the horizontal of the measuring unit, a coordinates acquiring unit for detecting a position of the surveying instrument and an arithmetic processing unit, wherein a first image of the object to be measured is acquired by the image pickup unit from a first position where coordinates of the first position are acquired by the coordinates acquiring unit, a second image of the object to be measured is acquired by the image pickup unit from a second position where coordinates of the second position are acquired by the coordinates acquiring unit, wherein the measuring unit directs a distance measuring optical axis toward common measuring points as specified in the first image and the second image respectively, projects the distance measuring light, and carries out a first distance measurement from the first position and a second distance measurement from the second position, and wherein the arithmetic processing unit calculates horizontal distances from the first position and the second position respectively based on the tilt angles detected by the attitude detecting unit at the first position and the second position, on the first distance measurement and on the second distance measurement, and further the arithmetic processing unit is configured to calculate a base line length based on the coordinates of the first position and on the coordinates of the second position and to carry out a trilateration with respect to the measuring point based on the horizontal distance and on the base line length.

Further, in the surveying system according to the present invention, the coordinates acquiring unit is a GNSS device.

Further, in the surveying system according to the present invention, the surveying instrument is provided on an upper end of a monopod having a known length, and the coordinates acquiring unit is composed of the monopod and the attitude detecting unit for detecting a tilt angle of the monopod.

Further, in the surveying system according to the present invention, the measuring point is specified in the second image by an image matching of the first image and the second image.

Further, in the surveying system according to the present invention, the measuring instrument is provided at a known first installation reference point via the monopod and is provided at a known second installation reference point, the first position is obtained based on a tilt angle detected by the attitude detecting unit at the first installation reference point and on a length of the monopod, the second position is obtained based on a tilt angle detected by the attitude detecting unit at the second installation reference point and on the length of the monopod, and the base line length is obtained according to the first position and the second position.

Further, in the surveying system according to the present invention, the first position is obtained by tilting the monopod in one direction, the second position is obtained by tilting the monopod in the other direction, further, coordinates of the first position are acquired based on a tilt angle detected by the attitude detecting unit at the first position and on the length of the monopod, coordinates of the second position are acquired based on a tilt angle detected by the attitude detecting unit at the second position and on the length of the monopod, and the base line length is obtained according to the coordinates of the first position and the coordinates of the second position.

Further, in the surveying system according to the present invention, the surveying instrument is provided at an installation reference point via the monopod and is provided at an installation point separated by a distance as required, the coordinates of the first position are acquired based on a tilt angle detected by the attitude detecting unit at the installation reference point and on the length of the monopod, the coordinates of the second position are acquired based on a tilt angle detected by the attitude detecting unit at the installation point, on a slope distance from the second position to the installation reference point determined by the surveying instrument, and on the length of the monopod, and the base line length is obtained according to the coordinates of the first position and the coordinates of the second position.

Further, in the surveying system according to the present invention, the surveying instrument comprises a GNSS device, the surveying instrument is provided at the installation reference point via the monopod and is provided at the installation point separated by the distance as required, the coordinates of the first position and the coordinates of the second position are acquired by the GNSS device respectively, and the base line length is obtained according to the coordinates of the first position and the coordinates of the second position.

Further, the surveying system according to the present invention further comprises an optical axis deflecting unit as provided on the projection optical axis of the distance measuring light, for deflecting the projection optical axis as the distance measuring optical axis, and capable of changing a deflection angle, wherein the arithmetic processing unit controls the attitude detecting unit so that the distance measuring light is irradiated to the measuring points.

Further, in the surveying system according to the present invention, the arithmetic processing unit calculates a tilt angle of the distance measuring optical axis with respect to the horizontal based on a tilt angle detected by the attitude detecting unit and on a deflection angle of the distance measuring optical axis detected by the optical axis deflecting unit.

Further, in the surveying system according to the present invention, the attitude detecting unit comprises a tilt detecting unit as rotatably supported around two axes perpendicular each other to an outer frame and for detecting a tilting from the horizontal, encoders provided on each of the axes, motors provided so as to rotate each axis, and an arithmetic unit for driving/controlling the motor based on a detection result from the tilt detecting unit, wherein the arithmetic unit drives the motors so that the tilt detecting unit detects the horizontal based on a signal from the tilt detecting unit when the outer frame is tilted and outputs a tilt angle based on outputs of the encoders when the tilt detecting unit detects the horizontal.

Further, in the surveying system according to the present invention, the tilt detecting unit comprises a first tilt sensor for detecting the horizontal with high accuracy and a second tilt sensor for detecting the tilting with higher responsiveness than the first tilt sensor, wherein the second tilt sensor detects the tilting from the horizontal as detected by the first tilt sensor, and the arithmetic unit is configured to detect a tilt angle based on a detection signal from the second tilt sensor.

Further, the surveying system according to the present invention further comprises a first optical axis deflecting unit disposed on the projection optical axis of the distance measuring light for deflecting the distance measuring optical axis at a deflection angle as required and in a direction as required, a second optical axis deflecting unit disposed on a light receiving optical axis for deflecting the reflected distance measuring light at the same deflection angle and in the same direction as the first optical axis deflecting unit and a projecting direction detecting unit for detecting a deflection angle and a deflecting direction by the first optical axis deflecting unit, wherein it is so arranged that the distance measuring light is projected through the first optical axis deflecting unit and the reflected distance measuring light is received by a photodetector through the second optical axis deflecting unit, three-dimensional data of the measuring point is acquired based on a distance measuring result of the distance measuring unit and on a detection result of the projecting direction detecting unit, and the three-dimensional data is corrected based on the result detected by the attitude detecting unit.

Furthermore, in the surveying system according to the present invention, the optical axis deflecting unit is composed of a pair of optical prisms in disk-like shape overlapped on each other, the first optical axis deflecting unit is composed of first prism elements provided at a center of the optical prisms, a second optical axis deflecting unit is composed of second prism elements provided around the first prism elements, each optical prism can be independently rotated respectively, and a rotation angle of each optical prism can be individually detected.

According to the present invention, the surveying system comprises a surveying instrument, wherein the surveying instrument comprises a measuring unit for performing a distance measurement by projecting a distance measuring light toward an object to be measured and by receiving a reflected distance measuring light from the object to be measured, an image pickup unit having an image pickup optical axis running in parallel to a projection optical axis of the distance measuring light and for picking up an image including the object to be measured, an attitude detecting unit provided integrally with the measuring unit and for detecting a tilt angle with respect to the horizontal of the measuring unit, a coordinates acquiring unit for detecting a position of the surveying instrument and an arithmetic processing unit, wherein a first image of the object to be measured is acquired by the image pickup unit from a first position where coordinates of the first position are acquired by the coordinates acquiring unit, a second image of the object to be measured is acquired by the image pickup unit from a second position where coordinates of the second position are acquired by the coordinates acquiring unit, wherein the measuring unit directs a distance measuring optical axis toward common measuring points as specified in the first image and the second image respectively, projects the distance measuring light, and carries out a first distance measurement from the first position and a second distance measurement from the second position, and wherein the arithmetic processing unit calculates horizontal distances from the first position and the second position respectively based on the tilt angles detected by the attitude detecting unit at the first position and the second position, on the first distance measurement and on the second distance measurement, and further the arithmetic processing unit is configured to calculate a base line length based on the coordinates of the first position and on the coordinates of the second position and to carry out a trilateration with respect to the measuring point based on the horizontal distance and on the base line length. As a result, the surveying of the measuring point can be performed without performing a leveling operation of the surveying instrument and without a measuring a vertical angle.

BRIEF DESCRIPTION OF THE DRAWINGS

FIG. 5 is a schematical block diagram of the attitude detecting unit.

FIG. 8 is an explanatory drawing to show a relation between an object to be measured and a vertical line.

FIG. 9A, FIG. 9B and FIG. 9C are explanatory drawings to show a relation between a picked up image and a vertical image.

DETAILED DESCRIPTION OF THE PREFERRED EMBODIMENT

A description will be given below on an embodiment of the present invention by referring to the attached drawings.

First, referring to FIG. 1, a description will be given on an outline of a surveying system according to the present embodiment.

Figure 1:
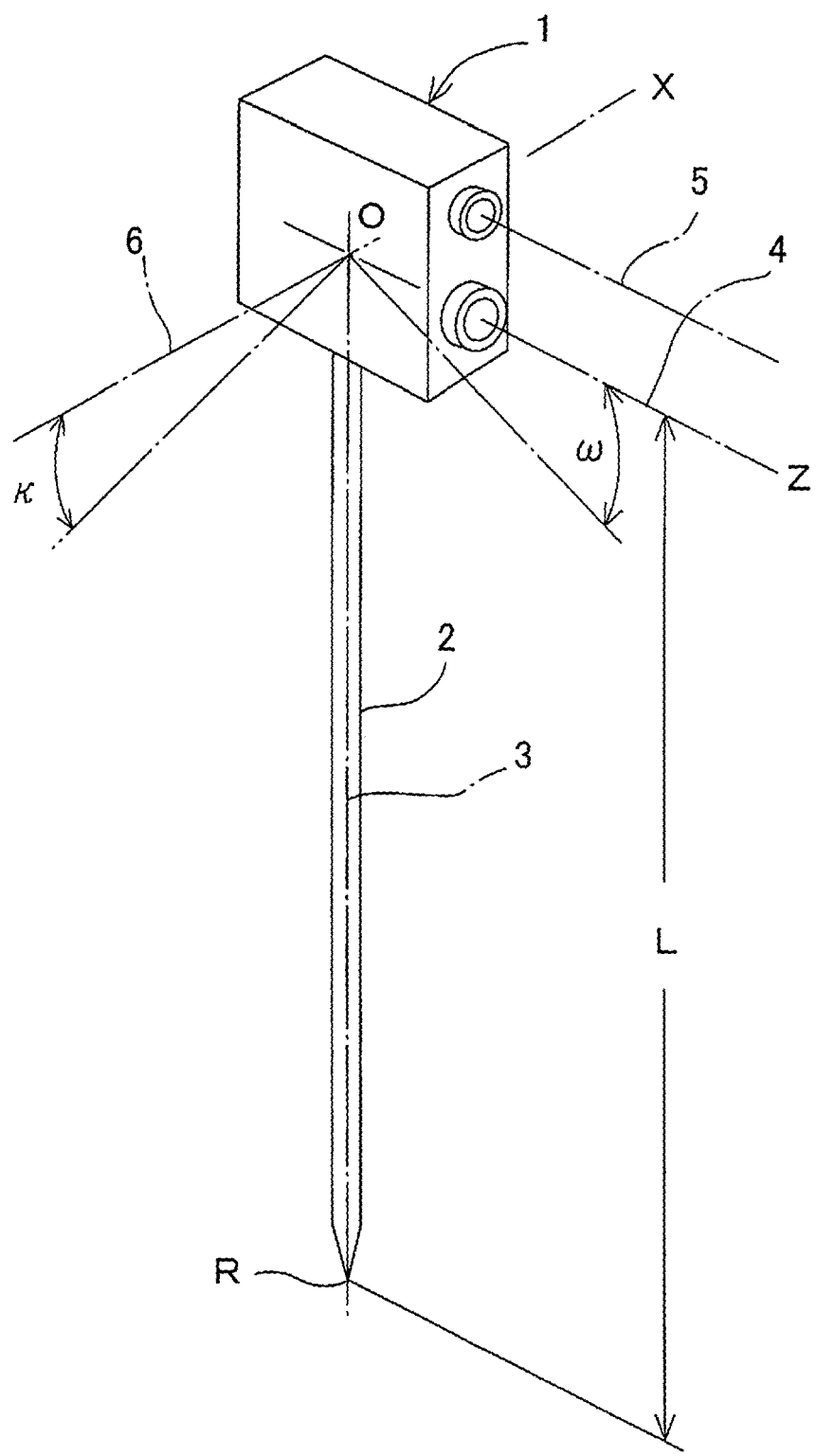
FIG. 1 is a schematical perspective view of an embodiment of the present invention.

In FIG. 1, reference numeral 1 denotes a surveying instrument, and reference numeral 2 denotes a monopod which has a known length. The surveying instrument 1 is provided on an upper end of the monopod 2. A lower end of the monopod 2 is designed as a tip and is installed on an installation reference point R, which is already known. By the surveying instrument 1, a measurement can be performed according to a prism measurement mode in which an object to be measured is a prism, and in a case where the object to be measured is a structure, or the like, the measurement can be performed according to a non-prism measurement mode without using the prism.

An axis 3 of the monopod 2 is set so as to pass through a mechanical reference point O of the surveying instrument 1. Further, in the figure, reference numeral 4 denotes a distance measuring optical axis, and reference numeral 5 denotes an image pickup optical axis. The distance measuring optical axis 4 perpendicularly crosses the axis 3, and the image pickup optical axis 5 runs in parallel to the distance measuring optical axis 4. Further, a straight line running perpendicularly to a plane including the axis 3 and the distance measuring optical axis 4 and passing through the mechanical reference point O is defined as a horizontal reference line 6.

Therefore, in the present embodiment, the axis 3, the distance measuring optical axis 4 and the horizontal reference line 6 are arranged so as to orthogonalize each other at the mechanical reference point O. Further, a distance between the distance measuring optical axis 4 and the image pickup optical axis 5 is already known, and a distance L between the lower end of the monopod 2 and the mechanical reference point O is also already known.

In a case where the surveying instrument 1 is installed at the installation reference point R, the surveying instrument 1 tilts (inclines) in two horizontal directions around the installation reference point R as a center. In the present embodiment, an angle to be tilted in a vertical direction with the distance measuring optical axis 4 as a reference is defined as a flap angle ω, and an angle to be tilted in the vertical direction with the horizontal reference line 6 as the reference is defined as an inclining angle κ.

Figure 2:
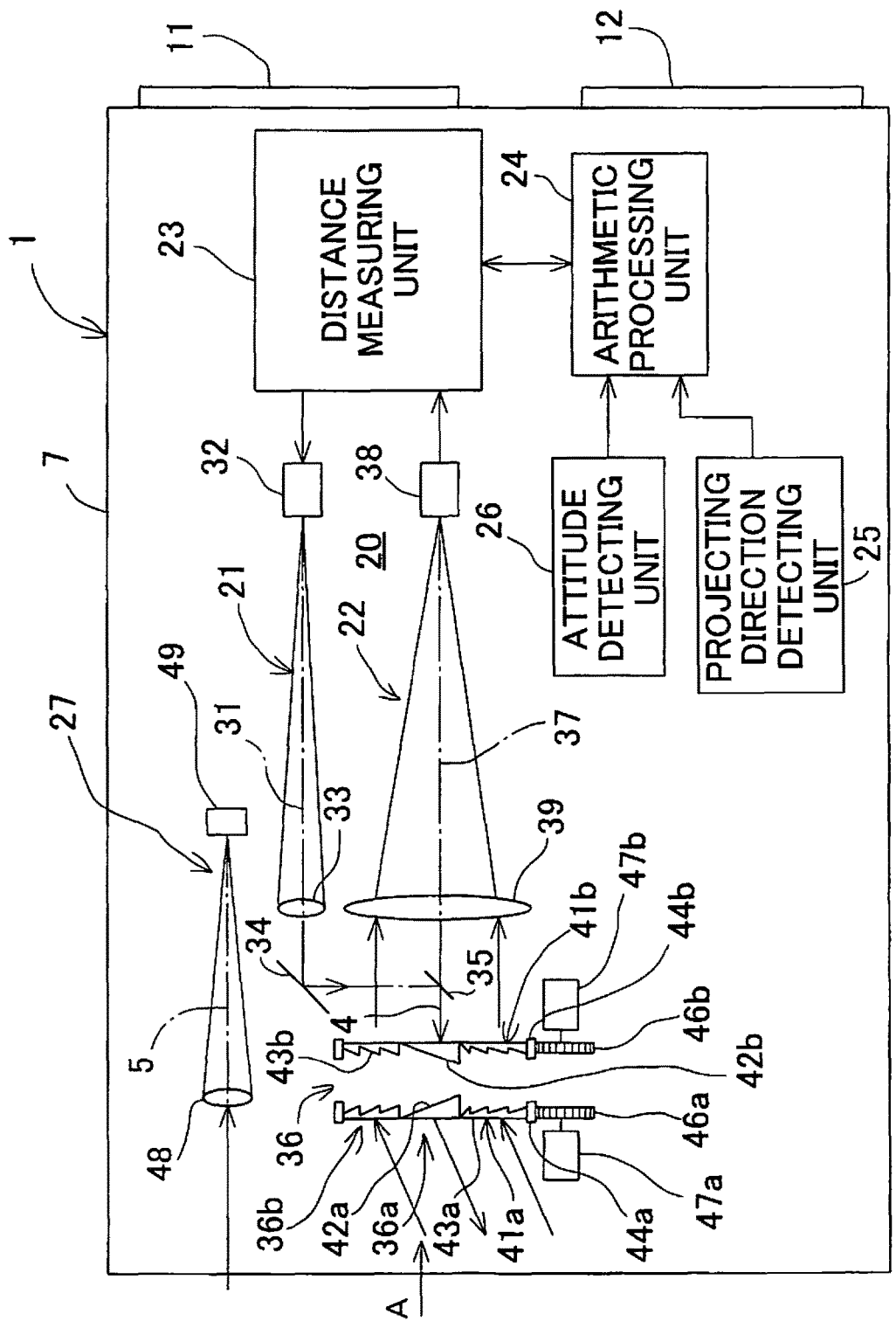
FIG. 2 is a schematical block diagram of a surveying instrument according to the present embodiment.
Figure 3:
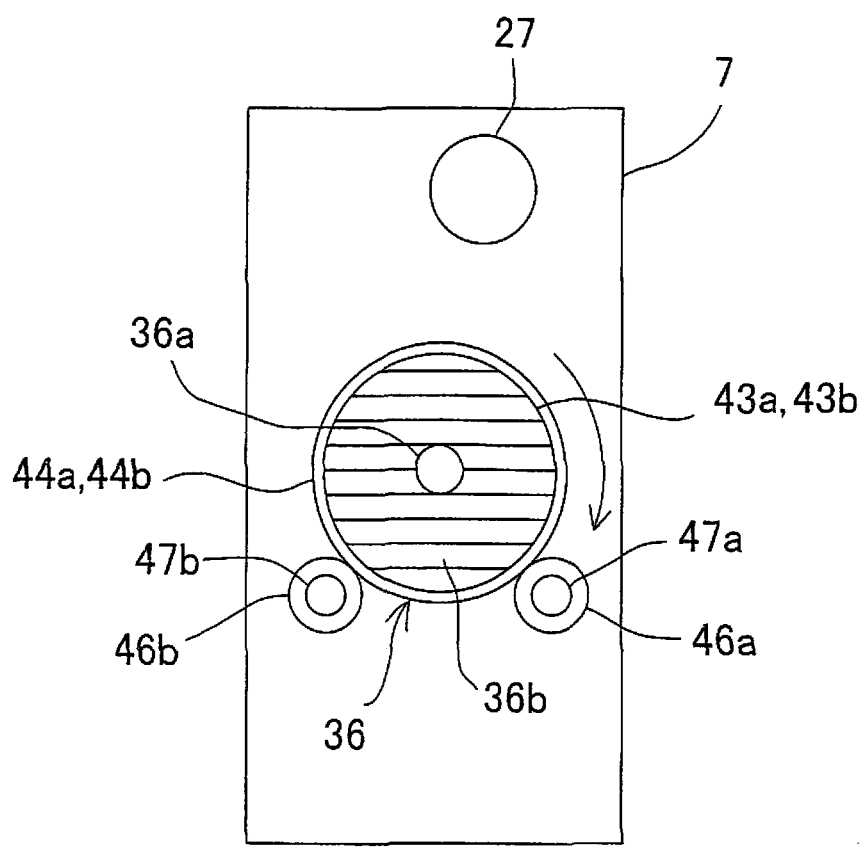
FIG. 3 is an arrow view along line A in FIG. 2.

Referring to FIG. 2 and FIG. 3, a description will be given on the surveying instrument 1.

The surveying instrument 1 has a display unit 11 and an operation unit 12 on a back surface of a casing 7. Further, the surveying instrument 1 primarily comprises a measuring unit 20 having the distance measuring optical axis 4, an arithmetic processing unit 24, a projecting direction detecting unit 25 for detecting a projecting direction of a distance measuring light, an attitude detecting unit 26 for detecting a tilting in the two horizontal directions of the surveying instrument 1, an image pickup unit 27 having the image pickup optical axis 5, and an optical axis deflecting unit 36 for deflecting the distance measuring optical axis 4, or the like inside the casing 7. Therefore, the measuring unit 20, the attitude detecting unit 26, the image pickup unit 27, and the optical axis deflecting unit 36 are integrated together. It is to be noted that the display unit 11 may be designed as a touch panel and may be also served as the operation unit 12.

The measuring unit 20 comprises a distance measuring light projecting unit 21, a light receiving unit 22, and a distance measuring unit 23.

The distance measuring light projecting unit 21 projects the distance measuring light. The distance measuring light projecting unit 21 has a projection optical axis 31, a light emitting element 32, for instance, a laser diode (LD) is provided on the projection optical axis 31. Further, a projecting lens 33 is provided on the projection optical axis 31.

Further, a first reflection mirror 34 as a deflecting optical component is provided on the projection optical axis 31. Further, a second reflection mirror 35 as the deflecting optical component is faced with the first reflection mirror 34 and disposed on a light receiving optical axis 37 (to be described later).

By the first reflection mirror 34 and the second reflection mirror 35, the projection optical axis 31 is coincided with the distance measuring optical axis 4. The optical axis deflecting unit 36 is disposed on the distance measuring optical axis 4.

The light receiving unit 22 receives a reflected distance measuring light from the object to be measured. The light receiving unit 22 has the light receiving optical axis 37 running in parallel to the projection optical axis 31, and the light receiving optical axis 37 is commonly used as the distance measuring optical axis 4.

A photodetector 38, for instance, a photo diode (PD), is provided on the light receiving optical axis 37. Further, an image forming lens 39 is disposed on the light receiving optical axis 37. The image forming lens 39 forms an image of the reflected distance measuring light on the photodetector 38. The photodetector 38 receives the reflected distance measuring light and produces a light receiving signal. The light receiving signal is inputted to the distance measuring unit 23.

Further, on the light receiving optical axis 37, the optical axis deflecting unit 36 is arranged on an objective side of the image forming lens 39.

The distance measuring unit 23 controls the light emitting element 32 and emits a laser beam as the distance measuring light. By the optical axis deflecting unit 36 (a distance measuring light deflecting unit 36a (to be described later)), the distance measuring optical axis 4 is deflected so as to direct toward a measuring point.

The reflected distance measuring light as reflected from the object to be measured enters the light receiving unit 22 via the optical axis deflecting unit 36 (a reflected distance measuring light deflecting unit 36b (to be described later)) and the image forming lens 39. The reflected distance measuring light deflecting unit 36b deflects again the distance measuring optical axis 4 as deflected by the distance measuring light deflecting unit 36a so that the distance measuring optical axis 4 is returned to an original condition, and the reflected distance measuring light is received by the photodetector 38.

The photodetector 38 sends the light receiving signal to the distance measuring unit 23. The distance measuring unit 23 performs a distance measurement of the measuring point (a point where the distance measuring light is projected) based on the light receiving signal from the photodetector 38.

The arithmetic processing unit 24 is configured by an input/output control unit, an arithmetic unit (CPU), a storage unit, or the like. The storage unit stores programs such as a distance measuring program for controlling a distance measuring operation, a control program for controlling drivings of motors 47a and 47b (to be described later), an image program for performing an image processing such as an image matching, or the like, an input/output control program, a directional angle calculating program for calculating directional angles (a horizontal angle and a vertical angle) of the distance measuring optical axis 4 based on calculation results in a projecting direction from the projecting direction detecting unit 25, or the like. Further, in the storage unit, measurement results such as distance measuring data, image data, or the like, are stored.

A description will be given on the optical axis deflecting unit 36.

In the optical axis deflecting unit 36, a pair of optical prisms 41a and 41b is provided. Each of the optical prisms 41a and 41b is designed in disk-like shape, disposed perpendicularly crossing the light receiving optical axis 37, overlapped on each other, and arranged in parallel to each other. As for the optical prisms 41a and 41b, a Fresnel prism is preferably used respectively in order to reduce a size of an instrument.

A central part of the optical axis deflecting unit 36 is designed as the distance measuring light deflecting unit 36a where the distance measuring light passes, and a part except the central part is designed as the reflected distance measuring light deflecting unit 36b.

The Fresnel prism used as the optical prisms 41a and 41b is composed of prism elements 42a and 42b and a large number of prism elements 43a and 43b arranged in parallel to each other respectively and has a plate shape. The prism element 42a and the prism element 42b as well as the prism element 43a and the prism element 43b have the same optical characteristics respectively.

The prism elements 42a and 42b make up the distance measuring light deflecting unit 36a, and the prism elements 43a and 43b make up the reflected distance measuring light deflecting unit 36b.

The Fresnel prism may be manufactured by an optical glass but may be molded by an optical plastic material. By molding the Fresnel prism by the optical plastic material, a low cost Fresnel prism can be manufactured.

Each of the optical prisms 41a and 41b is arranged in such a manner that each of the optical prisms 41a and 41b rotates with the light receiving optical axis 37 as the center individually. The optical prisms 41a and 41b are controlled in such a manner that rotating directions, rotation amounts and rotating speeds are independently controlled. As a result, the optical prisms 41a and 41b deflect the distance measuring optical axis 4 of the distance measuring light as emitted in an arbitrary deflecting direction, and deflect the light receiving optical axis 37 of the reflected distance measuring light as received in parallel to the distance measuring optical axis 4.

Outer shapes of the optical prisms 41a and 41b are arranged in disk-like shape with the light receiving optical axis 37 as the center, respectively. Taking an expansion of the reflected distance measuring light into consideration, diameters of the optical prisms 41a and 41b are set so that a sufficient light amount can be obtained.

A ring gear 44a is fitted with an outer periphery of the optical prism 41a and a ring gear 44b is fitted with an outer periphery of the optical prism 41b.

A driving gear 46a meshes with the ring gear 44a, and the driving gear 46a is fixed to an output shaft of the motor 47a. A driving gear 46b meshes with the ring gear 44b, and the driving gear 46b is fixed to an output shaft of the motor 47b. The motors 47a and 47b are electrically connected to the arithmetic processing unit 24.

As the motors 47a and 47b, motors capable of detecting a rotation angle or motors which rotate corresponding to a driving input value, for instance, a pulse motor is used. Alternatively, a rotation amount of the motor may be detected by using a rotation detector for detecting a rotation amount (rotation angle) of the motor such as an encoder (not shown), for instance, or the like. The rotation amounts of the motors 47a and 47b are detected respectively by the projecting direction detecting unit 25, and the motors 47a and 47b are individually controlled by the arithmetic processing unit 24 based on detection results of the projecting direction detecting unit 25.

The driving gears 46a and 46b and the motors 47a and 47b are provided at positions not interfering with the distance measuring light projecting unit 21, for instance, on a lower side of the ring gears 44a and 44b.

The projecting lens 33, the distance measuring light deflecting unit 36a, or the like, make up a projecting optical system. The reflected distance measuring light deflecting unit 36b and the image forming lens 39, or the like, make up a light receiving optical system.

The projecting direction detecting unit 25 counts driving pulses input to the motors 47a and 47b and detects the rotation angles of the motors 47a and 47b. Alternatively, the projecting direction detecting unit 25 detects the rotation angles of the motors 47a and 47b based on signals from the encoders.

Further, the projecting direction detecting unit 25 calculates rotation positions of the optical prisms 41a and 41b based on the rotation angles of the motors 47a and 47b, and calculates a deflection angle (a deflecting direction) and the projecting direction of the distance measuring light based on refractive indexes and the rotation positions of the distance measuring light deflecting unit 36a (that is, the prism elements 42a and 42b). A calculation result is inputted to the arithmetic processing unit 24.

In the surveying instrument 1, the attitude detecting unit 26 detects an attitude (a tilt angle and a tilting direction) of the distance measuring unit 23 with respect to the projection optical axis 31. A detection result is inputted to the arithmetic processing unit 24.

Figure 4:
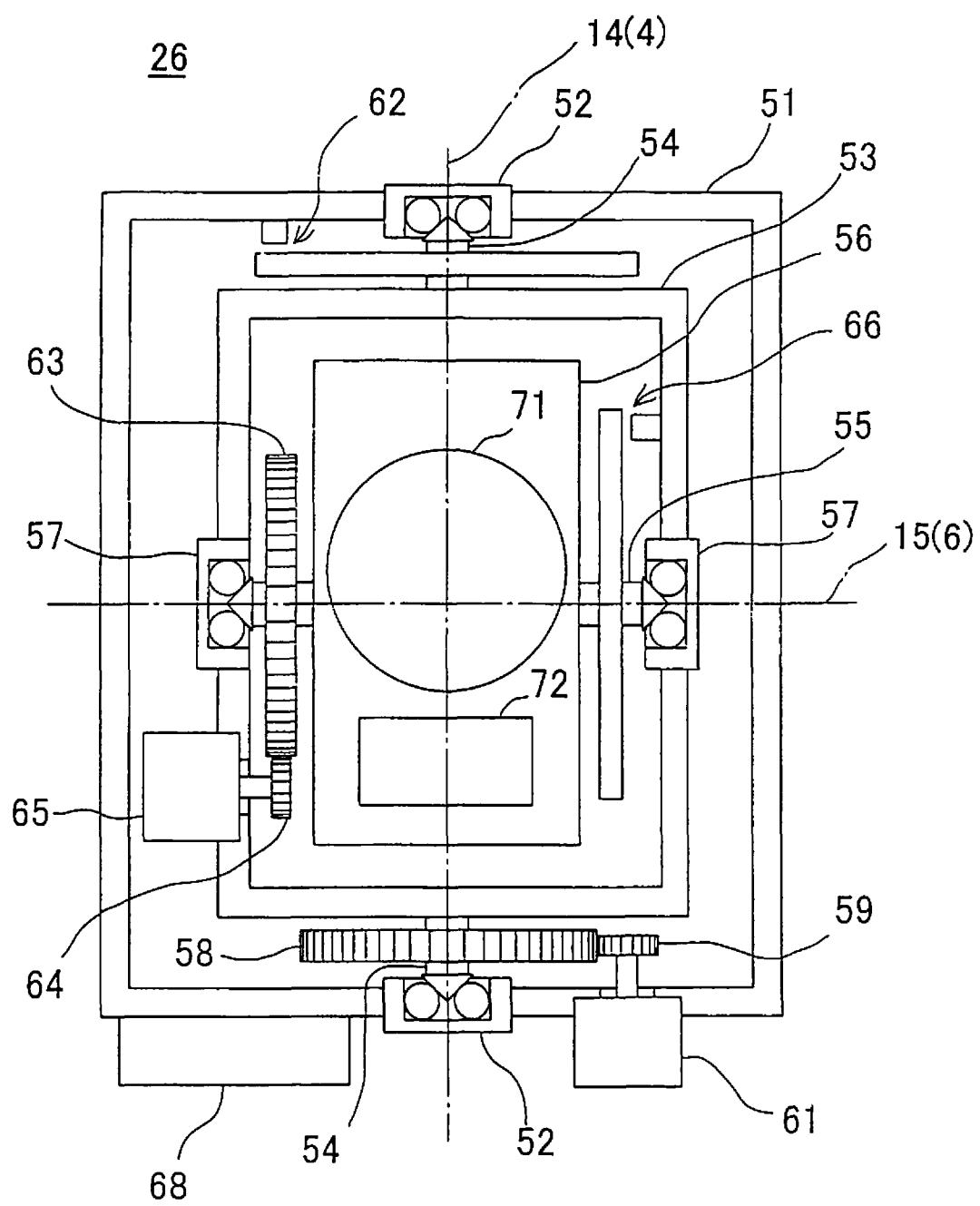
FIG. 4 is a plan view of an attitude detecting unit to be used in the present embodiment.

A description will be given below on the attitude detecting unit 26 by referring to FIG. 4 and FIG. 5. It is to be noted that FIG. 4 shows a plan view, and in the description as given below, the top and bottom corresponds to the top and bottom in FIG. 4, and the left and right corresponds to the left and right in FIG. 4.

Inside an outer frame 51 with a rectangular frame shape, an inner frame 53 with a rectangular frame shape is provided, and inside the inner frame 53, a tilt detecting unit 56 is provided.

From an upper surface and a lower surface of the inner frame 53, longitudinal shafts 54 and 54 are protruded. The longitudinal shafts 54 and 54 are rotatably fitted with bearings 52 and 52 as provided on the outer frame 51. The longitudinal shafts 54 and 54 have a longitudinal axis 14, and the inner frame 53 is capable of rotating freely by 360° in a left-to-right direction around the longitudinal shafts 54 and 54 as the center. The longitudinal axis 14 of the longitudinal shafts 54 and 54 is arranged so as to coincide with either one of the distance measuring optical axis 4 or the horizontal reference line 6, for instance, with the distance measuring optical axis 4, or to run in parallel to each other.

The tilt detecting unit 56 is supported by a lateral shaft 55, and both end portions of the lateral shaft 55 are rotatably fitted with bearings 57 and 57 provided on the inner frame 53. The lateral shaft 55 has a lateral axis 15 perpendicular to the longitudinal axis 14, and the tilt detecting unit 56 is capable of rotating freely by 360° in an up-to-bottom direction around the lateral shaft 55 as the center. The lateral axis 15 of the lateral shaft 55 is arranged so as to coincide with either different one of the distance measuring optical axis 4 or the horizontal reference line 6, for instance, with the horizontal reference line 6, or to run in parallel to each other.

That is, the tilt detecting unit 56 is configured so as to be supported via a zimbal mechanism, which is capable of rotating freely by 360° in two axial directions with respect to the outer frame 51.

On one of the longitudinal shafts 54 and 54, for instance, a first gear 58 is attached to the lower longitudinal shaft 54, and a first driving gear 59 meshes with the first gear 58. Further, a first motor 61 is provided on a lower surface of the outer frame 51, and the first driving gear 59 is attached to an output shaft of the first motor 61.

On the other of the longitudinal shafts 54 and 54, a first encoder 62 is attached. The first encoder 62 is configured so as to detect a rotation angle in the left-to-right direction of the inner frame 53 with respect to the outer frame 51. That is, referring to FIG. 1, the first encoder 62 detects the flap angle ω.

On one end of the lateral shaft 55, a second gear 63 is attached, and a second driving gear 64 meshes with the second gear 63. Further, on a side surface (left side surface in the figure) of the inner frame 53, a second motor 65 is attached, and the second driving gear 64 is attached to an output shaft of the second motor 65.

On the other end of the lateral shaft 55, a second encoder 66 is attached. The second encoder 66 is configured so as to detect a rotation angle in the up-to-bottom direction of the tilt detecting unit 56 with respect to the inner frame 53. That is, referring to FIG. 1, the second encoder 66 detects the inclining angle κ.

The first encoder 62 and the second encoder 66 are electrically connected to an arithmetic unit 68, and a detection result is inputted to the arithmetic unit 68.

The tilt detecting unit 56 has a first tilt sensor 71 and a second tilt sensor 72, and the first tilt sensor 71 and the second tilt sensor 72 are electrically connected to the arithmetic unit 68. The detection results by the first tilt sensor 71 and the second tilt sensor 72 are inputted to the arithmetic unit 68.

Further description will be given on the attitude detecting unit 26 by referring to FIG. 5.

The attitude detecting unit 26 comprises the first encoder 62, the second encoder 66, the first tilt sensor 71, the second tilt sensor 72, the arithmetic unit 68, the first motor 61, and the second motor 65. Further, the attitude detecting unit 26 comprises a storage unit 73 and an input/output control unit 74.

In the storage unit 73, programs such as a calculation program for an attitude detection and the like, and data such as calculation data and the like are stored.

The input/output control unit 74 drives the first motor 61 and the second motor 65 based on a control instruction output from the arithmetic unit 68 and outputs a result of a tilt detection calculated by the arithmetic unit 68 as a detection signal.

The first tilt sensor 71 is for detecting the horizontal with high accuracy, for instance, a tilt detector in which a detection light incidents to a horizontal liquid surface and the horizontal is detected according to a change of a reflection angle of a reflected light, or a bubble tube which detects a tilting according to a positional change of an air bubble sealed in a tube. Further, the second tilt sensor 72 is for detecting a tilt change with high responsiveness, for instance, an acceleration sensor.

It is to be noted that both the first tilt sensor 71 and the second tilt sensor 72 can individually detect tiltings in the two axial directions, which are a rotating direction (a tilting direction) detected by the first encoder 62 and a rotating direction (a tilting direction) detected by the second encoder 66.

The arithmetic unit 68 calculates a tilt angle and a tilting direction based on detection results from the first tilt sensor 71 and the second tilt sensor 72. Further, the arithmetic unit 68 calculates a tilt angle of the surveying instrument 1 with respect to a verticality based on a rotation angle of the first encoder 62 and on a rotation angle of the second encoder 66, which correspond to the tilt angle and the tilting direction.

By synthesizing the rotation angle of the first encoder 62 and the rotation angle of the second encoder 66 as calculated, the tilt angle and the tilting direction are calculated. The tilt angle and the tilting direction correspond to a tilt angle and a tilting direction (a relative tilt angle) of the casing 7 with respect to the horizontal, i.e. a tilt angle and a tilting direction (a relative tilt angle) of the measuring unit 20.

Thus, the first motor 61, the second motor 65, the first encoder 62, the second encoder 66, and the arithmetic unit 68 make up a relative tilt angle detecting unit.

It is to be noted that in a case where the outer frame 51 is installed horizontally, the attitude detecting unit 26 is set such that the first tilt sensor 71 detects the horizontal, and further, is set such that an output of the first encoder 62 and an output of the second encoder 66 both indicate a reference position (rotation angle at 0').

A description will be given on an operation of the attitude detecting unit 26.

First, a description will be given below on a case where a tilting is detected with high accuracy.

When the attitude detecting unit 26 is tilted, the first tilt sensor 71 outputs a signal corresponding to a tilting.

The arithmetic unit 68 calculates a tilt angle and a tilting direction based on the signal from the first tilt sensor 71 and further calculates rotation amounts of the first motor 61 and the second motor 65 in order to make the tilt angle and the tilting direction 0 based on a calculation result. The arithmetic unit 68 outputs a driving command for driving the first motor 61 and the second motor 65 by the rotation amounts via the input/output control unit 74.

According to the driving command from the arithmetic unit 68, the first motor 61 and the second motor 65 are driven so as to be tilted oppositely to the calculated tilt angle and the tilting direction. Rotation amounts (the rotation angles) of the motors are detected by the first encoder 62 and the second encoder 66 respectively, and when the rotation angles reach the calculation results, the drivings of the first motor 61 and the second motor 65 are stopped.

In this state, under the condition where the outer frame 51 and the inner frame 53 are tilted, the tilt detecting unit 56 is controlled to the horizontal.

Therefore, in order to make the tilt detecting unit 56 horizontal, the tilt angles, at which the inner frame 53 and the tilt detecting unit 56 are tilted by the first motor 61 and the second motor 65, are acquired based on the rotation angles as detected by the first encoder 62 and the second encoder 66.

The arithmetic unit 68 calculates the tilt angle and the tilting direction of the attitude detecting unit 26 with respect to the horizontal based on the detection results of the first encoder 62 and the second encoder 66 when the first tilt sensor 71 detects the horizontal. The calculation result indicates the attitude of the attitude detecting unit 26 after the attitude detecting unit 26 is tilted.

Further, the rotation angle as detected by the first encoder 62 corresponds to the flap angle ω, and the rotation angle as detected by the second encoder 66 corresponds to the inclining angle κ.

Therefore, the tilt angle and the tilting direction as calculated by the arithmetic unit 68 are a tilt angle and a tilting direction of the surveying instrument 1 with respect to the horizontal.

The arithmetic unit 68 outputs the calculated tilt angle and the tilting direction to an outside via the input/output control unit 74 as a detection signal of the attitude detecting unit 26.

In the attitude detecting unit 26, as a structure shown in FIG. 4, there is nothing which restricts rotations of the tilt detecting unit 56 and the inner frame 53. Therefore, the tilt detecting unit 56 and the inner frame 53 can both rotate by 360° or more. That is, no matter what attitude the attitude detecting unit 26 takes (even in a case where the attitude detecting unit 26 is upside down, for instance), the attitude detection in all directions can be performed.

In a case where high responsiveness is required, although the attitude detection and an attitude control are performed based on the detection result of the second tilt sensor 72, the second tilt sensor 72 has poorer detection accuracy than the first tilt sensor 71 in general.

In the present embodiment, by comprising the first tilt sensor 71 with high accuracy and the second tilt sensor 72 with high responsiveness, the attitude control is performed based on the detection results of the second tilt sensor 72, and the attitude detection with high accuracy can be performed by the first tilt sensor 71.

That is, based on the tilt angle as detected by the second tilt sensor 72, the first motor 61 and the second motor 65 are driven so that the tilt angle becomes 0°. Further, by continuing the driving of the first motor 61 and the second motor 65 until the first tilt sensor 71 detects the horizontal, the attitude can be detected with high accuracy. If a deviation occurs between values of the first encoder 62 and the second encoder 66 when the first tilt sensor 71 detects the horizontal (that is, an actual tilt angle) and the tilt angle as detected by the second tilt sensor 72, the tilt angle of the second tilt sensor 72 can be calibrated based on the deviation.

Therefore, by obtaining a relation between the detected tilt angle of the second tilt sensor 72 and the tilt angle which is obtained based on the horizontal detection by the first tilt sensor 71 and the detection result of the first encoder 62 and the second encoder 66 in advance, the tilt angle detected by the second tilt sensor 72 can be calibrated. Thereby, accuracy of the attitude detection with high responsiveness by the second tilt sensor 72 can be improved.

Next, the image pickup unit 27 has the image pickup optical axis 5. Under the condition where the optical axis deflecting unit 36 does not deflect the distance measuring optical axis 4, the image pickup optical axis 5 is set so as to run in parallel to the distance measuring optical axis 4. On the image pickup optical axis 5, an image forming lens 48 and an image pickup element 49 are provided.

A field angle of the image pickup unit 27 is set so as to be equivalent to or somewhat larger than an area where an optical axis can be deflected by the optical axis deflecting unit 36. The field angle of the image pickup unit 27 is set to 5°, for instance.

Further, image pickup element 49 is a CCD or a CMOS sensor which is an aggregate of pixels, and it is so arranged that a position of each pixel on an image element can be specified. For instance, the position of each pixel is specified by a coordinate system with an optical axis of each camera as an origin point.

Figure 6A:
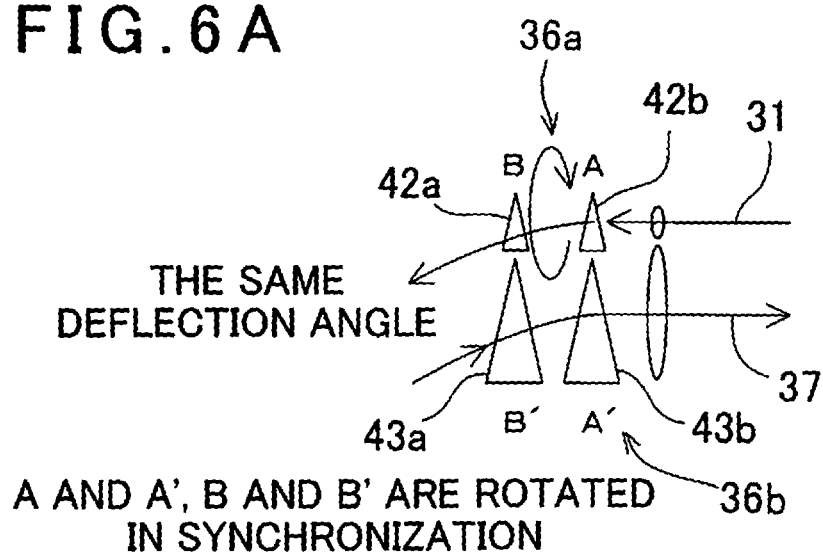
FIG. 6A, FIG. 6B and FIG. 6C are explanatory drawings to show an operation of an optical axis deflecting unit.

First, a description will be given on a measurement operation by the surveying instrument 1 by referring to FIG. 6A, FIG. 6B and FIG. 6C. To simplify the explanation, in FIG. 6A, the optical prisms 41a and 41b are shown by separating the prism elements 42a and 42b and the prism elements 43a and 43b. Further, the prism elements 42a and 42b and the prism elements 43a and 43b as shown in FIG. 6A are in a state in which maximum deflection angles can be obtained. Further, the minimum deflection angle is a position where either one of the optical prisms 41a or 41b is rotated by 180°, the deflection angle becomes 0°, and an optical axis of a laser beam as projected (the distance measuring optical axis 4) becomes parallel to the projection optical axis 31.

A distance measuring light is emitted from the light emitting element 32, and the distance measuring light is turned to a parallel luminous flux by the projecting lens 33 and projected toward an object to be measured or a measurement target area through the distance measuring light deflecting unit 36a (the prism elements 42a and 42b). Here, by passing through the distance measuring light deflecting unit 36a, the distance measuring light is deflected to a direction as required and projected by the prism elements 42a and 42b.

The reflected distance measuring light as reflected by the object to be measured or by the measurement target area is incident through the reflected distance measuring light deflecting unit 36b (the prism elements 43a and 43b) and is focused on the photodetector 38 by the image forming lens 39.

Since the reflected distance measuring light passes through the reflected distance measuring light deflecting unit 36b, the optical axis of the reflected distance measuring light is deflected by the prism elements 43a and 43b so as to coincide with the light receiving optical axis 37 (FIG. 6A).

By a combination of the rotation positions of the optical prism 41a and the optical prism 41b, the deflecting direction and deflection angle of the distance measuring light to be projected can be arbitrarily changed.

Further, under a condition where a positional relation between the optical prism 41a and the optical prism 41b is fixed (under a condition where the deflection angles obtained by the optical prism 41a and the optical prism 41b are fixed), by rotating the optical prism 41a and the optical prism 41b integrally by the motors 47a and 47b, a locus drawn by the distance measuring light passing through the distance measuring light deflecting unit 36a becomes a circle with the distance measuring optical axis 4 as the center.

Therefore, by rotating the optical axis deflecting unit 36 while emitting the laser beam from the light emitting element 32, the distance measuring light can be scanned by the locus of the circle.

It is to be noted that it is needless to say that the reflected distance measuring light deflecting unit 36*b* is rotated integrally with the distance measuring light deflecting unit 36*a*.

Figure 6B:
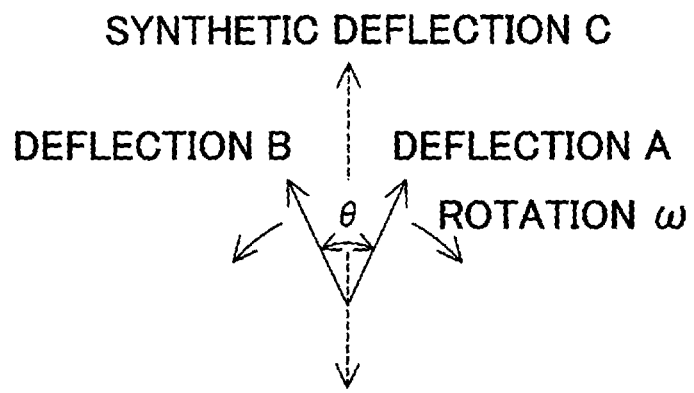

Next, FIG. 6B illustrates a case in which the optical prism 41*a* and the optical prism 41*b* are relatively rotated. Assuming that a deflecting direction of the optical axis as deflected by the optical prism 41*a* is a deflection "A" and the deflecting direction of the optical axis as deflected by the optical prism 41*b* is a deflection "B", the deflection of the optical axis by the optical prisms 41*a* and 41*b* becomes a synthetic deflection "C" as an angle difference θ between the optical prisms 41*a* and 41*b*.

Therefore, each time the angle difference θ is changed, by rotating the optical axis deflecting unit 36 once, the distance measuring light can be scanned linearly.

Figure 6C:
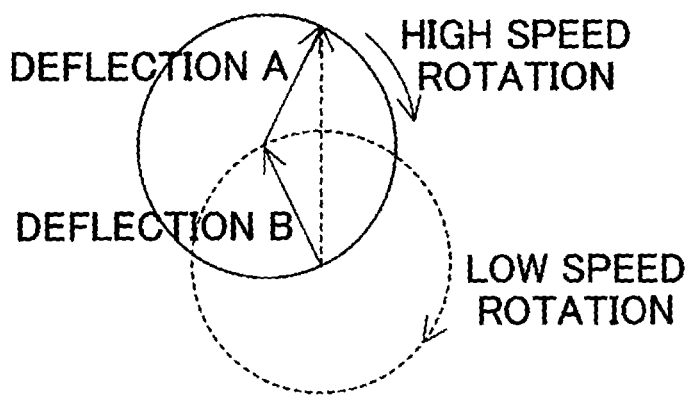

Further, as illustrated in FIG. 6C, when the optical prism 41*b* is rotated at a rotating speed lower than the rotating speed of the optical prism 41*a*, since the distance measuring light is rotated while the angle difference θ is gradually increased, the scanning locus of the distance measuring light becomes a spiral form.

Furthermore, by individually controlling the rotating direction and the rotating speed of the optical prism 41*a* and the optical prism 41*b*, the scanning locus of the distance measuring light is made in an irradiating direction (scanning in the radial direction) with the projection optical axis 31 as the center or in a horizontal direction or in a vertical direction or the like, and various scanning states can be obtained.

As a mode of measurement, by performing a distance measurement by fixing the optical axis deflecting unit 36 (the optical prisms 41*a* and 41*b*) per each deflection angle as required, the distance measurement can be performed with respect to a specific measuring point. Further, by executing the distance measurement while changing the deflection angles of the optical axis deflecting unit 36, that is, by executing the distance measurement while scanning the distance measuring light, distance measurement data with respect to a measuring point on the scanning locus can be acquired.

Further, the projection directional angle of each distance measuring light can be detected by the rotation angles of the motors 47*a* and 47*b*, and by associating the projection directional angle with the distance measurement data, three-dimensional distance measurement data can be acquired.

Further, a tilting of the projection optical axis 31 with respect to the horizontal can be detected by the attitude detecting unit 26, and based on the tilting as detected by the attitude detecting unit 26, the distance measurement data is corrected and the distance measurement data with high accuracy can be acquired.

Next, in the present embodiment, the three-dimensional distance measurement data is acquired and image data can also be acquired.

When the object to be measured is selected, the surveying instrument 1 is directed toward the object to be measured so that the object to be measured is captured by the image pickup unit 27. An image acquired by the image pickup unit 27 is displayed on the display unit 11.

Since the image acquired by the image pickup unit 27 is equal to or approximately equal to a measurement area of the surveying instrument 1, and the measuring operator can visually specify the measurement area easily.

Further, since the distance measuring optical axis 4 and the image pickup optical axis 5 are parallel to each other, and both the optical axes are in a known relation, the arithmetic processing unit 24 can match the image center with the distance measuring optical axis 4 on the image by the image pickup unit 27. Further, by detecting the projection directional angle of the distance measuring light, the arithmetic processing unit 24 can specify a measuring point on the image based on the projection directional angle. Therefore, it is possible to easily associate the three-dimensional data of the measuring point with the image, and the image as acquired by the image pickup unit 27 can be turned to an image with the three-dimensional data.

Figure 7A:
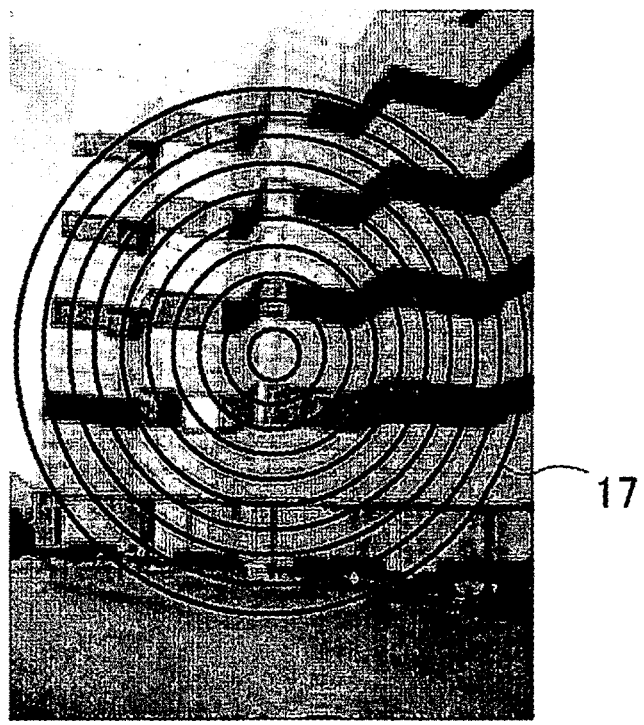
FIG. 7A and FIG. 7B are explanatory drawings to show a relation between an acquired image and a scanning locus.
Figure 7B:
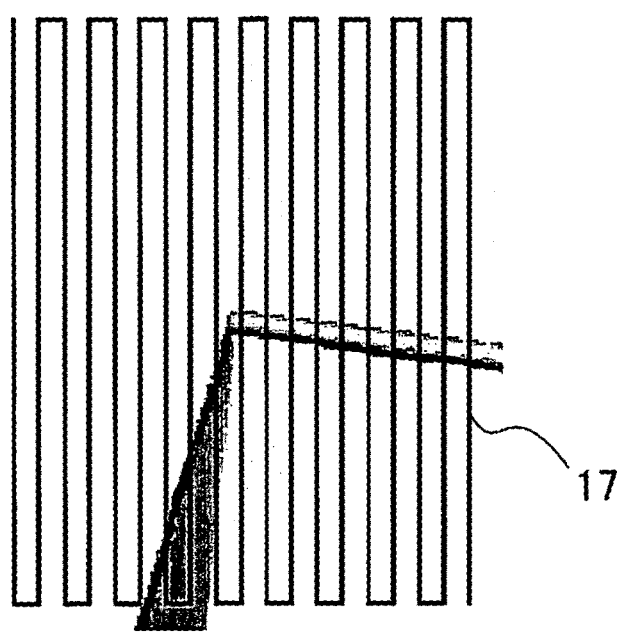

FIG. 7A and FIG. 7B show a relation between an image acquired by the image pickup unit 27 and a locus obtained on the measuring point. It is to be noted that FIG. 7A shows a case in which the distance measuring light is scanned in a concentric and multi-circular form and FIG. 7B shows a case in which the distance measuring light is reciprocally scanned linearly. In the figure, reference numeral 17 denotes a scanning locus and the measuring points are positioned on the scanning locus 17.

In the description as given above, the distance measuring light deflecting unit 36*a* and the reflected distance measuring light deflecting unit 36*b* are formed on the same optical prism and integrated together. On the other hand, the projection optical axis 31 and the light receiving optical axis 37 are separated from each other, the distance measuring light deflecting unit 36*a* and the reflected distance measuring light deflecting unit 36*b* are provided individually on the projection optical axis 31 and the light receiving optical axis 37, and further it may be so arranged that the distance measuring light deflecting unit 36*a* and the reflected distance measuring light deflecting unit 36*b* are synchronously rotated so that the deflecting directions by the distance measuring light deflecting unit 36*a* and the reflected distance measuring deflecting unit 36*b* coincide with each other.

A description will be given below on a measuring operation of the surveying instrument 1.

First, referring to FIG. 8, FIG. 9A, FIG. 9B and FIG. 9C, a description will be given on a case where the verticality of the object to be measured is determined.

It is to be noted that in a description as given below, as shown in FIG. 8, an inclining of the object to be measured 81 means a tilting with respect to a vertical line 83.

FIG. 9A shows an image 82 of the object to be measured 81 as picked up by the image pickup unit 27. Since the image 82 includes the tilting of the image pickup unit 27, the verticality as obtained from the image 82 itself is different from an actual verticality.

When the image 82 is picked up, a tilt angle and a tilting direction of the image pickup unit 27, i.e. a tilt angle and a tilting direction of the surveying instrument 1 with respect to the horizontal, can be detected by the attitude detecting unit 26. The tilt angle and the tilting direction as detected are a tilting and a tilting direction of the image at the time of an image pickup. The arithmetic processing unit 24 calculates a tilting of the image with respect to the horizontal or vertical based on this tilting and tilting direction, and shows a plurality of vertical lines 83 and a plurality of horizontal lines 84 in the image based on this calculation result (FIG. 9B).

Since the image 82 is a perspective image (an image in which a near object is displayed large and a far object is displayed small), a distance between the vertical lines 83 becomes narrower toward the upper part in the image 82. The arithmetic processing unit 24 performs an image processing so that the vertical lines 83 become in parallel to each other. Hereinafter, the image after the image processing is referred as a vertical image 82' (FIG. 9C).

In the vertical image 82', if a point on the object to be measured 81 which should be vertical, a ridge line of a pillar or a wall, for instance, is compared with the vertical lines 83, a vertical condition of the object to be measured 81 can be visually judged from the image.

Further, because the distance measuring light can be irradiated to an arbitrary point in the image by the optical axis deflecting unit 36, a measurement may be performed on at least two points of the object to be measured 81, preferably on a specific point, e.g. on two upper and lower points of the pillar, or the measurement may be performed on two points on the vertical line 83, and then three-dimensional coordinates of the two points may be acquired, and an accurater vertical condition may be determined based on coordinate values.

Figure 10:
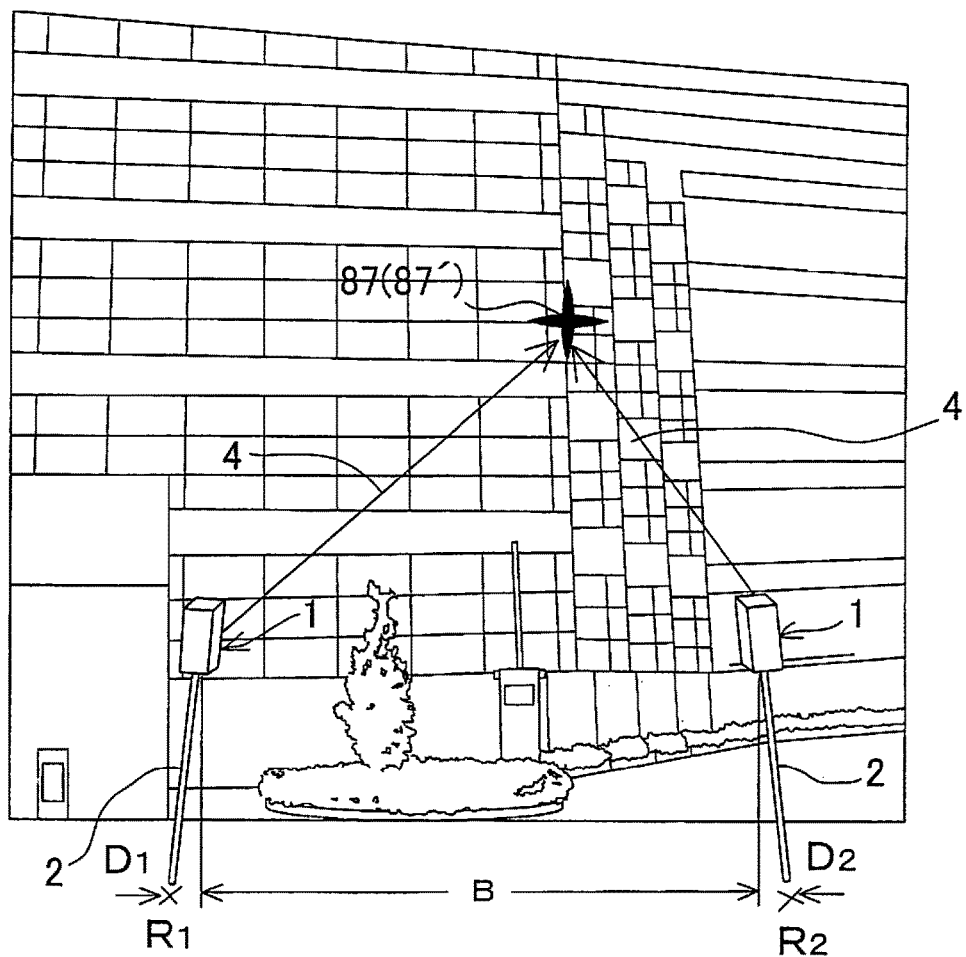
FIG. 10 is an explanatory drawing of a first embodiment in a trilateration.

Next, referring to FIG. 10, a description will be given on a first embodiment to perform a trilateration by using the surveying instrument 1.

The surveying instrument 1 is installed in such a manner that a lower end of the monopod 2 is positioned at a first installation reference point R1 (a first position), which is a known point (the coordinates are already known).

A first image is obtained with respect to the object to be measured by the image pickup unit 27, and a measuring point 87 is selected from the image. Here, a selection of the measuring point 87 may be confirmed visually in the image or may be selected by an image processing such as a feature extraction (an edge extraction), or the like.

The distance measuring optical axis 4 is directed toward the measuring point 87, and a slope distance to the measuring point 87 is determined. It is to be noted that the distance measuring optical axis 4 and the image pickup optical axis 5 are regarded to be in a parallel condition.

A tilt angle of the distance measuring optical axis 4 with respect to the horizontal at this moment is detected by the attitude detecting unit 26. Therefore, a horizontal distance to the measuring point 87 is obtained by the arithmetic processing unit 24 based on this tilt angle and the slope distance.

Further, a tilt angle of the monopod 2 with respect to the vertical is also detected by the attitude detecting unit 26. Since the length of the monopod 2 is already known, displacement D1 of the surveying instrument 1 in a horizontal direction with respect to the first installation reference point R1 is obtained by the arithmetic processing unit 24 based on the tilt angle.

Further, the surveying instrument 1 is installed in such a manner that the lower end of the monopod 2 is positioned at a second installation reference point R2 (a second position), which is a known point (the coordinates are already known).

A second image is obtained with respect to the object to be measured by the image pickup unit 27, and a measuring point 87' which is common to the measuring point 87 is specified on the image. The distance measuring optical axis 4 is directed toward the measuring point 87' from the second installation reference point R2, and a slope distance to the measuring point 87' is determined.

It is to be noted that an operation for specifying the measuring point 87' in the second image may be performed by an image matching as described later.

The tilt angle of the distance measuring optical axis 4 with respect to the horizontal at the second installation reference point R2 is detected by the attitude detecting unit 26. Therefore, a horizontal distance to the measuring point 87' is obtained by the arithmetic processing unit 24 based on this tilt angle and the slope distance.

Further, the tilt angle of the monopod 2 with respect to the vertical at the second installation reference point R2 is also detected by the attitude detecting unit 26. Displacement D2 of the surveying instrument 1 in the horizontal direction with respect to the second installation reference point R2 is obtained by the arithmetic processing unit 24 based on the length of the monopod 2 and the tilt angle.

Based on the horizontal displacements D1 and D2 and a distance between the first installation reference point R1 and the second installation reference point R2, a distance between the surveying instrument 1 at the first installation reference point R1 and the surveying instrument 1 at the second installation reference point R2 (a base line length B (see FIG. 10)) is obtained by the arithmetic processing unit 24.

Thus, based on the horizontal distance from the first installation reference point R1, the horizontal distance from the second installation reference point R2, and the base line length B, the trilateration is performed with respect to the measuring point 87.

Further, referring to FIG. 11, a description will be given on a second embodiment of the trilateration.

Figure 11:
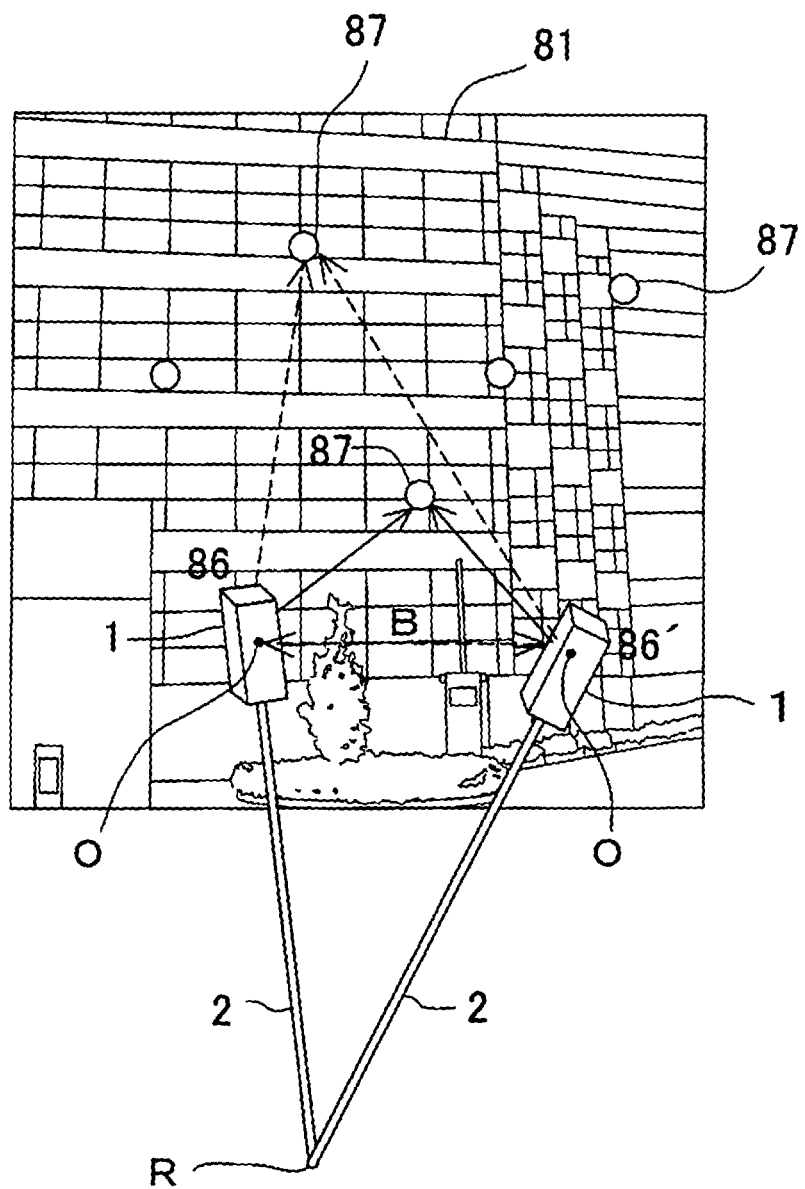
FIG. 11 is an explanatory drawing of a second embodiment in the trilateration.

As shown in FIG. 11, a surveying instrument 1 is installed in such a manner that a lower end of a monopod 2 is positioned at the installation reference point R, which is a known point (the coordinates are already known).

The surveying instrument 1 is tilted approximately in parallel and in one direction with respect to an object to be measured 81, a tilted state is regarded as a first position 86, and an image 85 (not shown) of the object to be measured 81 is acquired at the first position 86. The image 85 is displayed on a display unit 11. While observing the image 85, directions of a distance measuring optical axis 4 and an image pickup optical axis 5 are set so that a measuring position and a measuring area as planned are included in the image 85. After setting, one or more measuring points 87 are selected in the image 85. It is to be noted that the measuring point 87 is a point which is extracted from the image 85 by an image processing such as a feature extraction (an edge extraction), or the like.

Further, under a condition where the surveying instrument 1 is tilted, an optical axis deflecting unit 36 is operated. A position of the measuring point 87 in the image 85 can be obtained from a deviation from the image pickup optical axis 5 on an image pickup element 49. Further, a field angle with respect to the image pickup optical axis 5 is obtained based on the position on an image pick up element 49. Therefore, a deflection angle of the measuring point 87 with respect to the image pickup optical axis 5 can be obtained.

The arithmetic processing unit 24 controls the optical axis deflecting unit 36 and deflects the distance measuring optical axis 4 to the deflection angle as obtained.

The distance measuring optical axis 4 is directed toward the measuring point 87, and a distance measurement is performed with respect to the measuring point 87 from the first position 86 (a slope distance is obtained).

The tilt angle of the surveying instrument 1 with respect to the horizontal is detected by the attitude detecting unit 26. Therefore, a tilt angle of the image pickup optical axis 5 with respect to the horizontal is obtained based on a detection result of the attitude detecting unit 26 and on a deflection angle by the optical axis deflecting unit 36. The horizontal distance to the measuring point 87 is determined by the arithmetic processing unit 24 based on the tilt angle of the image pick up optical axis 5 and on the slope distance.

Since a distance L between the lower end of the monopod 2 (i.e. the installation reference point R) and a mechanical reference point O of the surveying instrument 1 is already known, based on the distance L and a tilt angle of an axis 3

(see FIG. 1) at the first position 86, a three-dimensional position (three-dimensional coordinates) of the mechanical reference point O with respect to the installation reference point R can be calculated.

Next, the surveying instrument 1 is tilted approximately in parallel and in the other direction with respect to the object to be measured 81, and an image 85' (not shown) of the object to be measured 81 at a second position 86' under a tilted state is acquired. Further, a direction of the distance measuring optical axis 4 is adjusted so that the image 85' is within the same area or approximately same area as the image 85.

The image matching is carried out with respect to the image 85 and the image 85', and the measuring point 87 as selected in the image 85 is specified in the image 85'. The measuring point 87 is superimposed on the image 85' and is displayed on the display unit 11.

The optical axis deflecting unit 36 is operated, the distance measuring optical axis 4 is directed toward the measuring point 87 as specified, and the distance measurement (a measurement of the slope distance) is performed with respect to the measuring point 87 from the second position 86'. A tilt angle of the surveying instrument 1 at the second position 86' is detected by the attitude detecting unit 26. The horizontal distance from the second position 86' to the measuring point 87 is obtained by the arithmetic processing unit 24 based on the tilt angle of the surveying instrument 1, the deflection angle as obtained by the optical axis deflecting unit 36 and the slope distance.

Based on the distance L and on the tilt angle of the axis 3 (see FIG. 1) at the second position 86', the three-dimensional position (the three-dimensional coordinates) of the mechanical reference point O at the second position 86' with respect to the installation reference point R can be calculated.

Based on the three-dimensional position (the three-dimensional coordinates) of the mechanical reference point O at the first position 86 and on the three-dimensional position (the three-dimensional coordinates) of the mechanical reference point O at the second position 86', distances between the mechanical points O (the base line length B) can be obtained.

Therefore, distances between the measuring positions and horizontal distances of two sides from each of the measuring positions to the measuring point can be determined respectively, and three-dimensional coordinates of the measuring point 87 with the installation reference point R as a reference can be determined.

Further, by associating the image as matched and results of a three-dimensional measurement, an image with three-dimensional data can be acquired.

As described above, an angle measurement is not included in a measuring operation. For this reason, the angle measurement, which requires high accuracy and with high operational burden, is omitted and an efficiency of the measuring operation can be improved.

It is to be noted that a specification of the measuring point in the image by the image matching as described above are disclosed in Japanese Patent Laid-Open Publication No. 2009-210388.

Next, a description will be given on the image matching in the present embodiment.

First, a description will be given on a general image matching by referring to FIG. 12.

In order to perform a three-dimensional measurement on images acquired at two points, a relative orientation operation is required.

In a case where the images are acquired at the two points, directions of a camera are determined by $\varphi$, $\omega$ and $\kappa$.

Therefore, directions of the camera at the two points are expressed by $\varphi1$, $\omega1$, $\kappa1$, $\varphi2$, $\omega2$ and $\kappa2$, respectively.

In the general relative orientation, $\varphi1$, $\omega1$, $\kappa1$, $\varphi2$, $\omega2$ and $\kappa2$ are unknown. This means that $\varphi1$, $\omega1$, $\kappa1$, $\varphi2$, $\omega2$ and $\kappa2$ are obtained based on common points in the two images. In this case, required common points are 6 or more.

Figures 12, 13:
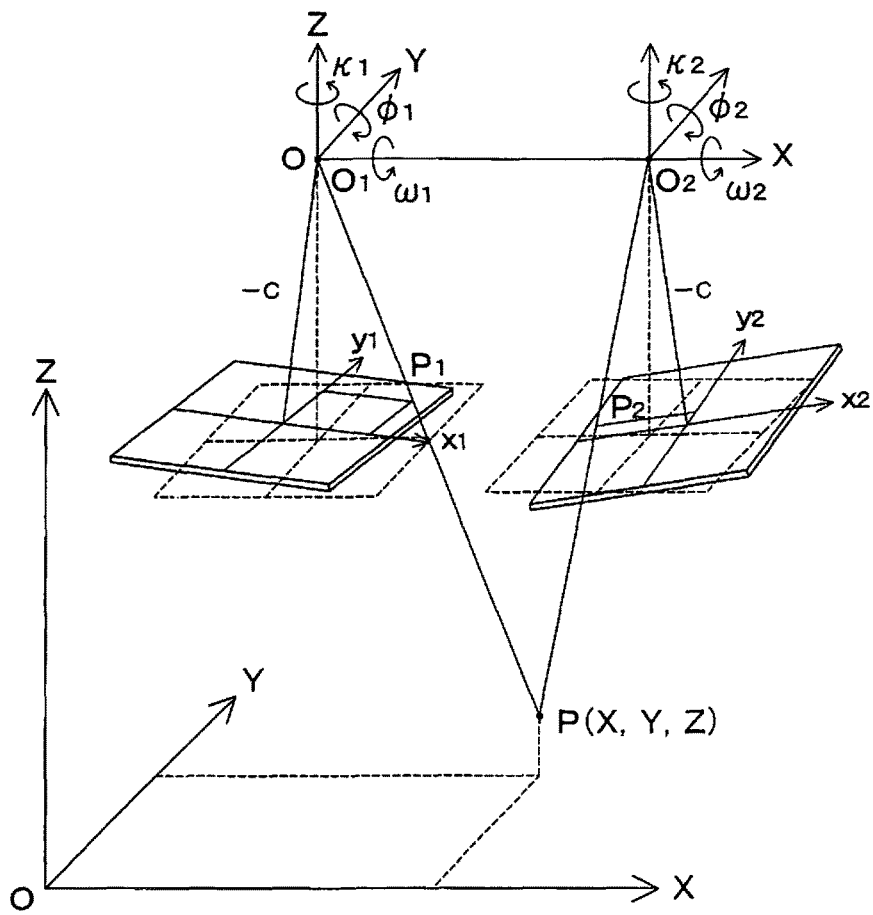
FIG. 12 is an explanatory drawing about a relative orientation operation in an image matching.
FIG. 13 is a drawing to show an equation to obtain parameters in a relative orientation.

As shown in FIG. 12, a projection center O1 on the left side is regarded as an origin point of a model coordinate system, and a line connecting the projection center O1 with a projection center O2 on the right side is regarded as an X-axis. As for a scale, a base line length is regarded as a unit length. Here, if the coordinate system as shown in FIG. 12 is corresponded to FIG. 1, the distance measuring optical axis 4 corresponds to a Z-axis, and the horizontal reference line 6 corresponds to the X-axis.

Parameters as obtained in this case are: a rotation angle $\kappa1$ of the Z-axis of the camera on the left side, a rotation angle $\varphi1$ of a Y-axis of the camera on the left side, a rotation angle $\omega1$ of the X-axis of the camera on the left side, a rotation angle $\kappa2$ of the Z-axis of the camera on the right side, a rotation angle $\varphi2$ of the Y-axis of the camera on the right side, and a rotation angle $\omega2$ of the X-axis of the camera on the right side. In this case, since the rotation angle $\omega1$ of the X-axis of the camera on the left side is 0, there is no need to consider.

Therefore, $\varphi1$, $\kappa1$, $\varphi2$, $\omega2$ and $\kappa2$ are unknown quantities.

Further, with respect to $\varphi1$, $\kappa1$, $\varphi2$, $\omega2$ and $\kappa2$, each parameter is determined by solving an equation (1) as shown in FIG. 13.

In the equation (1):

$\kappa1$: The rotation angle of the Z-axis of the left side camera $\varphi1$: The rotation angle of the Y-axis of the left side camera $\kappa2$: The rotation angle of the Z-axis of the right side camera $\varphi2$: The rotation angle of the Y-axis of the right side camera $\omega2$: The rotation angle of the X-axis of the right side camera In the present embodiment, tilt angles in two directions with respect to the horizontal of the surveying instrument 1 (i.e. the image pickup unit 27) are detected by the attitude detecting unit 26 (see FIG. 1). That is, $\kappa1$, $\kappa2$ and $\omega2$ at the two points become known, respectively. Therefore, unknown quantities are limited only to $\varphi1$ and $\varphi2$, and a calculation can be extensively simplified.

When a trilateration is performed, each of inner angles can be calculated by using the theorem of cosines, and $\varphi1$ and $\varphi2$, which are inner angles at the first position 86 and the second position 86', can be easily obtained. Thus, the calculation of a relative orientation can be simplified.

Further, in the present embodiment, the perspective image can be turned to the vertical image by the image processing. By using the vertical image for the image matching, the relative orientation operation is not required, and the image matching can be simplified further. Further, by adopting the vertical image, an epipolar line can be formed immediately, and the vertical image becomes a three-dimensional model by a parallax measurement. Thus, a processing time can be extremely shortened.

Figure 14:
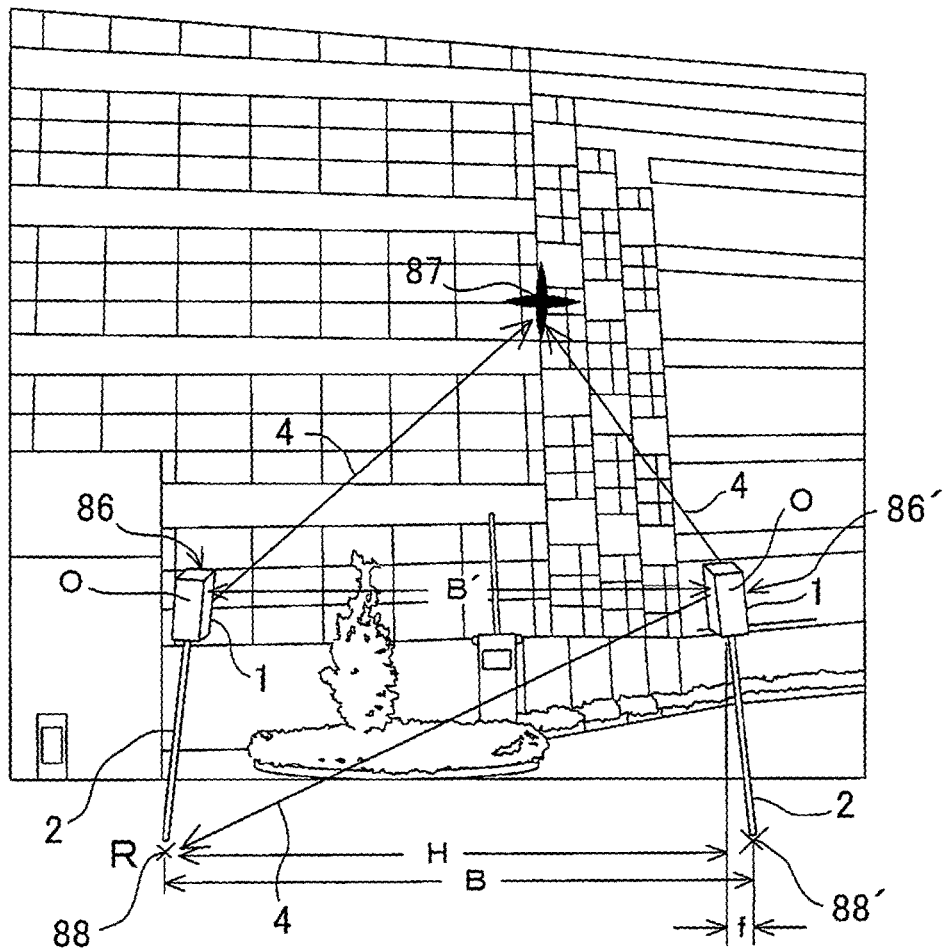
FIG. 14 is an explanatory drawing of a third embodiment in the trilateration.

Further, a description will be given on a third embodiment of the trilateration by referring to FIG. 14.

A surveying instrument 1 is installed at a first installation position (a known installation reference point R) 88 via a monopod 2. A mechanical reference point O at this time is regarded as a first position 86. From the first position 86, a first image is acquired with respect to an object to be measured, and a measuring point 87 is selected in the image. A distance measurement is performed by a distance measuring unit 23 with respect to the measuring point 87 as selected, and a tilting of the surveying instrument 1 at the time of the distance measurement is detected by the attitude detecting unit 26. Based on this tilt angle and a distance L of the monopod 2, a positional relation between the installation reference point R and the first position 86 is determined. Further, the first position 86 is calculated by the arithmetic processing unit 24.

The surveying instrument 1 is installed at a second installation position 88', which is separated by a distance as required from the installation reference point R. The mechanical reference point O at this time is regarded as a second position 86'. The distance measuring optical axis 4 is directed toward the installation reference point R from the second position 86', and the distance measuring unit 23 measures a distance between the second position 86' and the installation reference point R (a slope distance). A tilt angle of the surveying instrument 1 at the time of a slope distance measurement is detected by the attitude detecting unit 26.

Based on this tilt angle and the distance L of the monopod 2, a positional deviation "f" of the second position 86' with respect to the second installation position 88' is measured. Further, a horizontal distance H between the second position 86' and the installation reference point R (the first installation position 88) is obtained by the arithmetic processing unit 24 based on this tilt angle and a result of the slope distance measurement. This horizontal distance H is corrected (added) by the positional deviation "f", and the base line length B (a distance between the first installation position 88 and the second installation position 88') is calculated.

From the second position 86', the distance measuring optical axis 4 is directed toward the measuring point 87, and a second image of an area including the measuring point 87 is acquired. By a matching of the first image and the second image, the measuring point 87 is specified in the second image, and the distance measuring unit 23 performs the distance measurement with respect to the measuring point 87. A tilt angle at the time of the distance measurement is detected by the attitude detecting unit 26 (in a case where the tilt angle is different from the tilt angle when the slope distance is obtained).

Based on the tilt angle and on the distance L at the time of the distance measurement of the measuring point 87 at the first position 86, a deviation of the first position 86 with respect to the first installation position 88 is obtained, and based on the tilt angle and the distance L at the time of the distance measurement of the measuring point 87 at the second point 86', a deviation of the second position 86' with respect to the second installation position 88' is obtained. By the arithmetic processing unit 24, the position of the first position 86 with respect to the first installation position 88 is calculated, and the position of the second position 86' with respect to the second installation position 88' is calculated respectively.

Thus, a true base line length B' between the first position 86 and the second position 86' at the time of the measurement of the measuring point 87 is calculated.

Based on the true base line length B', on the results of the distance measurement of the measuring point 87 from the first position 86, and on the results of the distance measurement of the measuring point 87 from the second position 86', the trilateration with respect to the object to be measured is performed.

In the present third embodiment, since the true base line length B' can be taken longer, a measurement can be performed with respect to the object to be measured which is positioned at a long distance with high accuracy.

Figure 15:
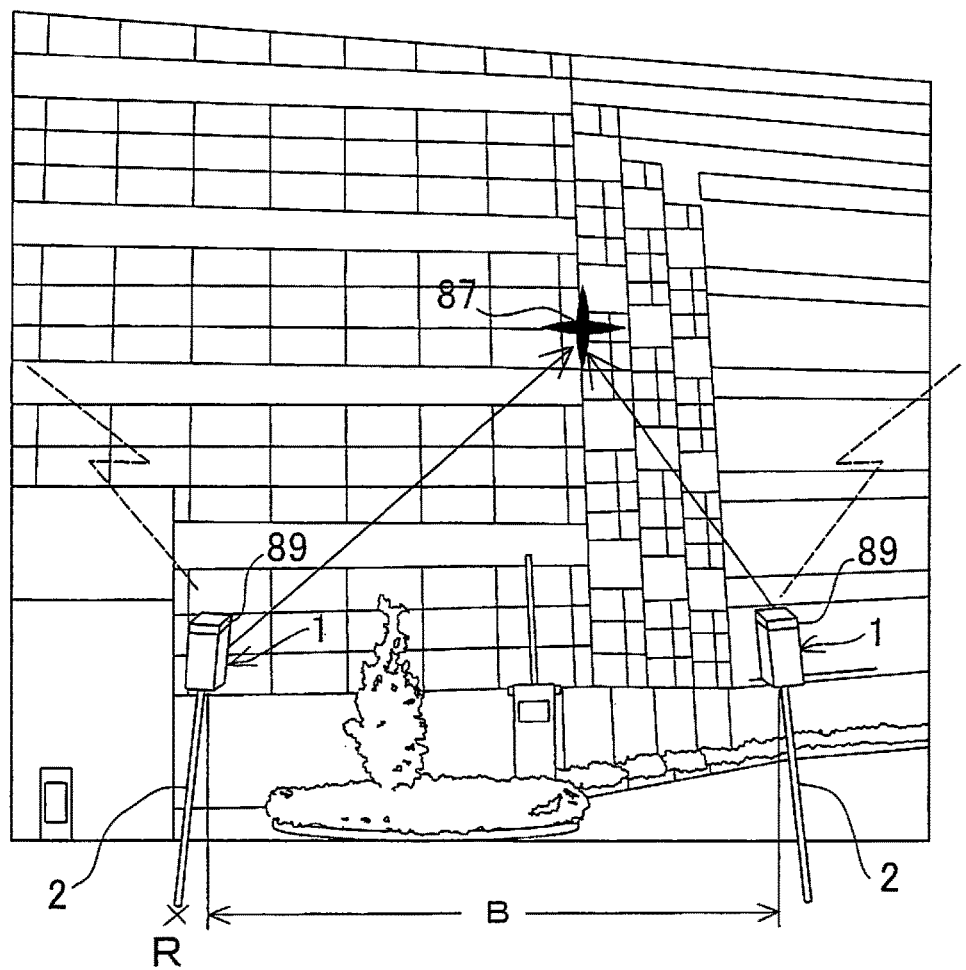
FIG. 15 is an explanatory drawing of a fourth embodiment in the trilateration.

Furthermore, referring to FIG. 15, a description will be given on a fourth embodiment of the trilateration.

In the present fourth embodiment, a GNSS (Global Navigation Satellite System) device 89 is provided on a surveying instrument 1.

By the GNSS device 89, three-dimensional coordinates (GNSS coordinates) of the surveying instrument 1 at a first position can be acquired, and further three-dimensional coordinates of the surveying instrument 1 at a second position can be acquired.

Therefore, a positional information of the surveying instrument 1 required in order to measure a measuring point 87 can be acquired, and further a base line length B can be also calculated based on the three-dimensional coordinates of the surveying instrument 1 at the first point and the second point. Therefore, the trilateration can be performed.

In the embodiments as given above, a description has been given on a case where the surveying instrument 1 is provided on an upper end of a monopod 2 with a known length. In these embodiments, the monopod 2 is installed in such a manner that a lower end is positioned at a known point, and a tilt angle of the monopod 2 is detected by an attitude detecting unit 26 as built in the surveying instrument 1.

Based on the known length of the monopod 2 and on the tilt angle and tilting direction as detected by the attitude detecting unit 26, the arithmetic processing unit 24 can calculate a position of a mechanical reference point O of the surveying instrument 1 with respect to the known point, that is, a coordinate position of the mechanical reference point O. Therefore, the monopod 2 and the attitude detecting unit 26 functions as a coordinates acquiring unit for obtaining the coordinate position of the mechanical reference point O of the surveying instrument 1.

Therefore, the GNSS device 89 may be used as a coordinates acquiring unit for obtaining the coordinate position of the mechanical reference point O. In a case where the GNSS device 89 is used as a coordinates acquiring unit 90, the monopod 2 may be omitted (see FIG. 15). Further, in the GNSS device 89, it is possible to acquire coordinates with a global coordinate as a standard, and a versatility of a measurement result is increased.

The invention claimed is:

1. A surveying system comprising: a surveying instrument, wherein said surveying instrument comprises a measuring unit for performing a distance measurement by projecting a distance measuring light toward an object to be measured and by receiving a reflected distance measuring light from said object to be measured, an image pickup unit having an image pickup optical axis running in parallel to a projection optical axis of said distance measuring light and for picking up an image including said object to be measured, an attitude detecting unit provided integrally with said measuring unit and for detecting a tilt angle with respect to the horizontal of said measuring unit, a coordinates acquiring unit for detecting a position of said surveying instrument and an arithmetic processing unit, wherein a first image of said object to be measured is acquired by said image pickup unit from a first position where coordinates of said first position are acquired by said coordinates acquiring unit, a second image of said object to be measured is acquired by said image pickup unit from a second position where coordinates of said second position are acquired by said coordinates acquiring unit, wherein said measuring unit directs a distance measuring optical axis toward common measuring points as specified in said first image and said second image respectively, projects said distance measuring light, and carries out a first distance measurement from said first position and a second distance measurement from said second position, and wherein said arithmetic processing unit calculates horizontal distances from said first position and said second position respectively based on the tilt angles detected by said attitude detecting unit at said first position and said second position, on said first distance measurement and on said second distance measurement, and further said arithmetic processing unit is configured to calculate a base line length based on the coordinates of said first position and on the coordinates of said second position and to carry out a trilateration with respect to said measuring point based on said horizontal distance and on said base line length.

2. The surveying system according to claim 1, wherein said coordinates acquiring unit is a GNSS device.

3. The surveying system according to claim 1, wherein said surveying instrument is provided on an upper end of a monopod having a known length, and said coordinates acquiring unit is composed of said monopod and said attitude detecting unit for detecting a tilt angle of said monopod.

4. The surveying system according to claim 3, wherein said measuring instrument is provided at a known first installation reference point via said monopod and is provided at a known second installation reference point, said first position is obtained based on a tilt angle detected by said attitude detecting unit at said first installation reference point and on a length of said monopod, said second position is obtained based on a tilt angle detected by said attitude detecting unit at said second installation reference point and on the length of said monopod, and said base line length is obtained according to said first position and said second position.

5. The surveying system according to claim 3, wherein said first position is obtained by tilting said monopod in one direction, said second position is obtained by tilting said monopod in the other direction, further, coordinates of said first position are acquired based on a tilt angle detected by said attitude detecting unit at said first position and on the length of said monopod, coordinates of said second position are acquired based on a tilt angle detected by said attitude detecting unit at said second position and on the length of said monopod, and said base line length is obtained according to the coordinates of said first position and the coordinates of said second position.

6. The surveying system according to claim 3, wherein said surveying instrument is provided at an installation reference point via said monopod and is provided at an installation point separated by a distance as required, the coordinates of said first position are acquired based on a tilt angle detected by said attitude detecting unit at said installation reference point and on the length of said monopod, the coordinates of said second position are acquired based on a tilt angle detected by said attitude detecting unit at said installation point, on a slope distance from said second position to said installation reference point determined by said surveying instrument, and on the length of said monopod, and said base line length is obtained according to the coordinates of said first position and the coordinates of said second position.

7. The surveying system according to claim 3, wherein said surveying instrument comprises a GNSS device, said surveying instrument is provided at the installation reference point via said monopod and is provided at the installation point separated by the distance as required, the coordinates of said first position and the coordinates of said second position are acquired by said GNSS device respectively, and said base line length is obtained according to the coordinates of said first position and the coordinates of said second position.

8. The surveying system according to claim 1, wherein said measuring point is specified in the second image by an image matching of said first image and said second image.

9. The surveying system according to claim 1, further comprising an optical axis deflecting unit as provided on said projection optical axis of said distance measuring light, for deflecting said projection optical axis as said distance measuring optical axis, and capable of changing a deflection angle, wherein said arithmetic processing unit controls said attitude detecting unit so that said distance measuring light is irradiated to said measuring points.

10. The surveying system according to claim 9, wherein said arithmetic processing unit calculates a tilt angle of said distance measuring optical axis with respect to the horizontal based on a tilt angle detected by said attitude detecting unit and on a deflection angle of said distance measuring optical axis detected by said optical axis deflecting unit.

11. The surveying system according to claim 10, wherein said attitude detecting unit comprises a tilt detecting unit as rotatably supported around two axes perpendicular each other to an outer frame and for detecting a tilting from the horizontal, encoders provided on each of said axes, motors provided so as to rotate each axis, and an arithmetic unit for driving/controlling said motor based on a detection result from said tilt detecting unit, wherein said arithmetic unit drives said motors so that said tilt detecting unit detects the horizontal based on a signal from said tilt detecting unit when said outer frame is tilted and outputs a tilt angle based on outputs of said encoders when said tilt detecting unit detects the horizontal.

12. The surveying system according to claim 11, wherein said tilt detecting unit comprises a first tilt sensor for detecting the horizontal with high accuracy and a second tilt sensor for detecting the tilting with higher responsiveness than said first tilt sensor, wherein said second tilt sensor detects the tilting from the horizontal as detected by said first tilt sensor, and said arithmetic unit is configured to detect a tilt angle based on a detection signal from said second tilt sensor.

13. The surveying system according to claim 10, wherein said optical axis deflecting unit is composed of a pair of optical prisms in disk-like shape overlapped on each other, said first optical axis deflecting unit is composed of first prism elements provided at a center of said optical prisms, a second optical axis deflecting unit is composed of second prism elements provided around said first prism elements, each optical prism can be independently rotated respectively, and a rotation angle of each optical prism can be individually detected.

14. The surveying system according to claim 9 further comprising a first optical axis deflecting unit disposed on said projection optical axis of said distance measuring light for deflecting said distance measuring optical axis at a deflection angle as required and in a direction as required, a second optical axis deflecting unit disposed on a light receiving optical axis for deflecting said reflected distance measuring light at the same deflection angle and in the same direction as said first optical axis deflecting unit and a projecting direction detecting unit for detecting a deflection angle and a deflecting direction by said first optical axis deflecting unit, wherein it is so arranged that said distance measuring light is projected through said first optical axis deflecting unit and said reflected distance measuring light is received by a photodetector through said second optical axis deflecting unit, three-dimensional data of said measuring point is acquired based on a distance measuring result of said distance measuring unit and on a detection result of said projecting direction detecting unit, and said three-dimensional data is corrected based on the result detected by said attitude detecting unit.

15. The surveying system according to claim 14, wherein said optical axis deflecting unit is composed of a pair of optical prisms in disk-like shape overlapped on each other, said first optical axis deflecting unit is composed of first prism elements provided at a center of said optical prisms, a second optical axis deflecting unit is composed of second prism elements provided around said first prism elements, each optical prism can be independently rotated respectively, and a rotation angle of each optical prism can be individually detected.

16. The surveying system according to claim 9, wherein said optical axis deflecting unit is composed of a pair of optical prisms in disk-like shape overlapped on each other, said first optical axis deflecting unit is composed of first prism elements provided at a center of said optical prisms, a second optical axis deflecting unit is composed of second prism elements provided around said first prism elements, each optical prism can be independently rotated respectively, and a rotation angle of each optical prism can be individually detected.

17. The surveying system according to claim 9, wherein said attitude detecting unit comprises a tilt detecting unit as rotatably supported around two axes perpendicular each other to an outer frame and for detecting a tilting from the horizontal, encoders provided on each of said axes, motors provided so as to rotate each axis, and an arithmetic unit for driving/controlling said motor based on a detection result from said tilt detecting unit, wherein said arithmetic unit drives said motors so that said tilt detecting unit detects the horizontal based on a signal from said tilt detecting unit when said outer frame is tilted and outputs a tilt angle based on outputs of said encoders when said tilt detecting unit detects the horizontal.

18. The surveying system according to claim 17, wherein said tilt detecting unit comprises a first tilt sensor for detecting the horizontal with high accuracy and a second tilt sensor for detecting the tilting with higher responsiveness than said first tilt sensor, wherein said second tilt sensor detects the tilting from the horizontal as detected by said first tilt sensor, and said arithmetic unit is configured to detect a tilt angle based on a detection signal from said second tilt sensor.

19. The surveying system according to claim 1, wherein said attitude detecting unit comprises a tilt detecting unit as rotatably supported around two axes perpendicular each other to an outer frame and for detecting a tilting from the horizontal, encoders provided on each of said axes, motors provided so as to rotate each axis, and an arithmetic unit for driving/controlling said motor based on a detection result from said tilt detecting unit, wherein said arithmetic unit drives said motors so that said tilt detecting unit detects the horizontal based on a signal from said tilt detecting unit when said outer frame is tilted and outputs a tilt angle based on outputs of said encoders when said tilt detecting unit detects the horizontal.

20. The surveying system according to claim 19, wherein said tilt detecting unit comprises a first tilt sensor for detecting the horizontal with high accuracy and a second tilt sensor for detecting the tilting with higher responsiveness than said first tilt sensor, wherein said second tilt sensor detects the tilting from the horizontal as detected by said first tilt sensor, and said arithmetic unit is configured to detect a tilt angle based on a detection signal from said second tilt sensor.

* * * * *